(12) United States Patent
Oblizajek et al.

(10) Patent No.: US 11,585,403 B2
(45) Date of Patent: Feb. 21, 2023

(54) METHODS OF ATTENUATING VIBRATION TRANSFER TO A PASSENGER COMPARTMENT

(71) Applicant: GM GLOBAL TECHNOLOGY OPERATIONS LLC, Detroit, MI (US)

(72) Inventors: Kenneth L. Oblizajek, Troy, MI (US); Nojan Medinei, Toronto (CA); Wojciech E. Suchta, Richmond Hill (CA)

(73) Assignee: GM Global Technology Operations LLC, Detroit, MI (US)

( * ) Notice: Subject to any disclaimer, the term of this patent is extended or adjusted under 35 U.S.C. 154(b) by 752 days.

(21) Appl. No.: 16/588,276

(22) Filed: Sep. 30, 2019

(65) Prior Publication Data
US 2021/0095737 A1    Apr. 1, 2021

(51) Int. Cl.
*F16F 15/00* (2006.01)
*B60K 5/12* (2006.01)

(52) U.S. Cl.
CPC .......... *F16F 15/002* (2013.01); *B60K 5/1283* (2013.01); *F16F 15/005* (2013.01)

(58) Field of Classification Search
None
See application file for complete search history.

(56) References Cited

U.S. PATENT DOCUMENTS

| | | |
|---|---|---|
| 4,650,170 A | 3/1987 | Fukushima |
| 4,789,142 A | 12/1988 | Hoying et al. |
| 4,793,600 A | 12/1988 | Kojima |
| 5,246,211 A | 9/1993 | Klein et al. |
| 5,246,213 A | 9/1993 | Zup et al. |
| 5,718,417 A | 2/1998 | Aoki |
| 5,911,412 A | 6/1999 | Durand et al. |
| 6,357,730 B1 | 3/2002 | Gugsch et al. |
| 9,440,674 B2 | 9/2016 | Oblizajek et al. |
| 10,906,370 B1* | 2/2021 | Hall .................... B60G 17/0157 |
| 11,440,366 B1* | 9/2022 | O'Shea ................ B60G 17/016 |

(Continued)

FOREIGN PATENT DOCUMENTS

| | | |
|---|---|---|
| DE | 19801277 A1 | 7/1999 |
| DE | 10316283 A1 | 10/2004 |

*Primary Examiner* — Steven M Marsh
(74) *Attorney, Agent, or Firm* — Quinn IP Law

(57) ABSTRACT

Methods of attenuating vibration transfer to a body of a vehicle using a dynamic mass of the vehicle via minimizing a particular angular frequency of a wheel. One method includes receiving vehicle information over a time interval and determining, based on the vehicle information, an instantaneous angular velocity that corresponds to a particular angular frequency of the wheel. This method includes generating a gain-and-phase-compensated actuator drive command to counteract a vibration that occurs at the particular angular frequency of the wheel, which is based on the instantaneous angular velocity, and communicating the gain-and-phase-compensated actuator drive command to a hydraulic mount assembly that supports the dynamic mass. This method includes actuating an actuator of the hydraulic mount assembly in response to the gain-and-phase-compensated actuator drive command in order to minimize the vibration transfer to the body due to the vibration that occurs at the particular angular frequency of the wheel.

19 Claims, 5 Drawing Sheets

(56) References Cited

U.S. PATENT DOCUMENTS

| | | | |
|---|---|---|---|
| 2002/0183903 A1* | 12/2002 | Levanoni | B60G 17/018 |
| | | | 701/31.4 |
| 2010/0244341 A1* | 9/2010 | Nemoto | F16F 13/268 |
| | | | 267/140.14 |
| 2014/0288776 A1* | 9/2014 | Anderson | B60G 13/14 |
| | | | 701/37 |
| 2014/0365074 A1* | 12/2014 | Kim | F16F 15/002 |
| | | | 701/36 |
| 2019/0118604 A1* | 4/2019 | Suplin | B60G 17/0152 |
| 2020/0247207 A1* | 8/2020 | Dhaens | B60G 17/016 |
| 2021/0061379 A1 | 3/2021 | Oblizajek et al. | |
| 2021/0095737 A1 | 4/2021 | Oblizajek et al. | |

* cited by examiner

METHODS OF ATTENUATING VIBRATION TRANSFER TO A PASSENGER COMPARTMENT

INTRODUCTION

There are numerous types of vibrations, noises, pulsations, disturbances, and other forms of fluctuating vibratory energy that may exist in a vehicle; these phenomena are hereafter collectively and broadly referred to as vibrations. Vehicles are subject to vibrations due to external factors, such as road conditions, and internal factors, such as operation of a powertrain, or rotation of non-uniform wheels (along a road) of the vehicle at corners of the vehicle When a vehicle operates, the excitation of irregularities at the corners of the vehicle may result in internally-generated periodic vibrations in the vicinity of passengers of the vehicle as well as at the powertrain of the vehicle. An example of an internal source of vibrations is a non-concentric, out-of-round, or otherwise irregular rotating part. For instance, if a non-uniformly manufactured tire or wheel is mounted to the vehicle, then when the part rotates, this may produce periodic or harmonic vibrations in the vehicle; that is, vibrations having a first order component centered at a first order frequency, as well as higher- or multi-order components centered at frequencies that are integer multiples of the first order frequency. A first order component of a periodic vibration is centered at the same frequency as the rotating object from which it emanates and, depending on the vehicle systems, may have a greater amplitude or intensity than its higher-order counterparts. For example, a wheel rotating at fifteen rotations per second (15 Hz) may produce periodic vibrations having a first order component at 15 Hz, a second order component at 30 Hz, a third order component at 45 Hz, and so on. The first order or 15 Hz component is usually more intense than the second and third order components. It should be appreciated that non-uniformly manufactured rotating parts are one potential source of periodic vibrations in the vehicle, as many others also exist.

Periodic vibrations caused by internal sources may propagate throughout the vehicle and may cause an undesirable shake or movement of certain vehicle components that is noticeable to the passenger of the vehicle. For instance, periodic vibrations generated at the wheel assemblies or corners may combine to create a dynamic force on a hydraulic mount (the hydraulic mount may support, for example, the powertrain) and simultaneously causes cyclical vibrations in a body of the vehicle that may be noticeable to the passenger of the vehicle. When this type of event occurs on a flat or smooth road surface, it is all the more apparent to the passenger and is sometimes referred to as smooth road shake (SRS). These vibrations may be sensed by the passenger of the vehicle and may be referred to herein as vehicle body vibrations. The frequencies of the vehicle body vibrations are usually proportional to speed and a first order harmonic of the tire rotation frequency (e.g., the rolling frequency of the tire).

SUMMARY

The present disclosure provides a method of attenuating vibration transfer to a body of a vehicle using a dynamic mass of the vehicle. The vehicle includes at least one wheel. One of the methods include receiving vehicle information over a time interval, and determining, based on the vehicle information, an instantaneous angular velocity that corresponds to a particular angular frequency of the wheel. This method also includes generating a gain-and-phase-compensated actuator drive command to counteract a vibration that occurs at the particular angular frequency of the wheel, which is based on the instantaneous angular velocity; and communicating the gain-and-phase-compensated actuator drive command to a hydraulic mount assembly that supports the dynamic mass. This method further includes actuating an actuator of the hydraulic mount assembly in response to the gain-and-phase-compensated actuator drive command in order to minimize the vibration transfer to the body due to the vibration that occurs at the particular angular frequency of the wheel.

In another one of the methods, the method includes receiving angular position information regarding change in angular position of the wheel over a time interval, and the angular position information is used to determine an angular frequency of the wheel. This method also includes determining, based on the angular position information, an instantaneous angular velocity that corresponds to a particular angular frequency of the wheel, and an angular position that corresponds to the wheel. This method further includes generating a gain-and-phase-compensated actuator drive command to counteract a vibration that occurs at the particular angular frequency of the wheel, which is based on the instantaneous angular velocity and the angular position of the wheel, and communicating the gain-and-phase-compensated actuator drive command to a hydraulic mount assembly that supports the dynamic mass. Furthermore, the method includes energizing a magnetic apparatus of an actuator of the hydraulic mount assembly which moves a plug to a displaced position to correspondingly lock a casing to a first plate in a secondary position, and locking the casing in the secondary position locks a decoupler to the first plate such that the decoupler abuts the first plate which causes the hydraulic action to occur through first and second chambers of the hydraulic mount assembly via an inertia track of the hydraulic mount assembly. This method also includes positioning the plug in a central position after locking the casing in the secondary position, wherein the central position is different from the displaced position. Furthermore, energizing the magnetic apparatus further comprises energizing the magnetic apparatus to change an amount of current to coils that magnetically interacts with magnets to cause fluctuation of the plug from the central position while the casing remains in the secondary position in order to minimize the vibration transfer to the body due to the vibration that occurs at the particular angular frequency of the wheel in response to the gain-and-phase-compensated actuator drive command.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges. The phrase "at least one of" as used herein should be construed to include the non-exclusive logical "or", i.e., A and/or B and so on depending on the number of components.

Figure 1:
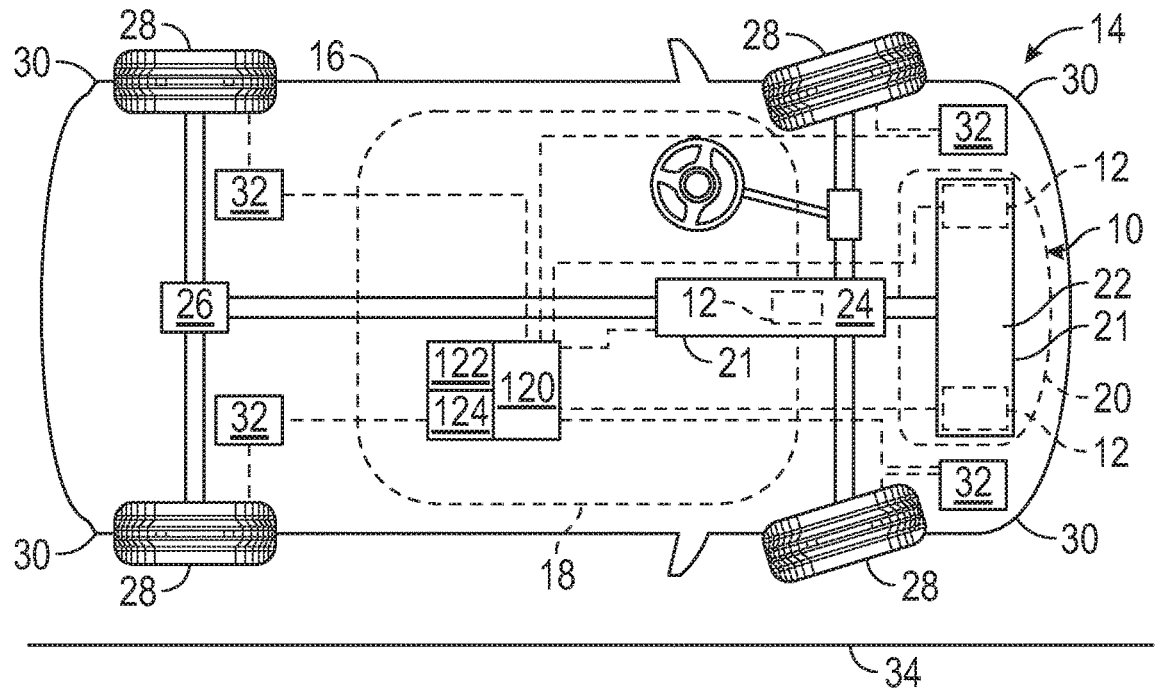
FIG. 1 is a schematic illustration of a powertrain with a dynamic mass, and a hydraulic mount assembly supporting the powertrain.
Figure 2:
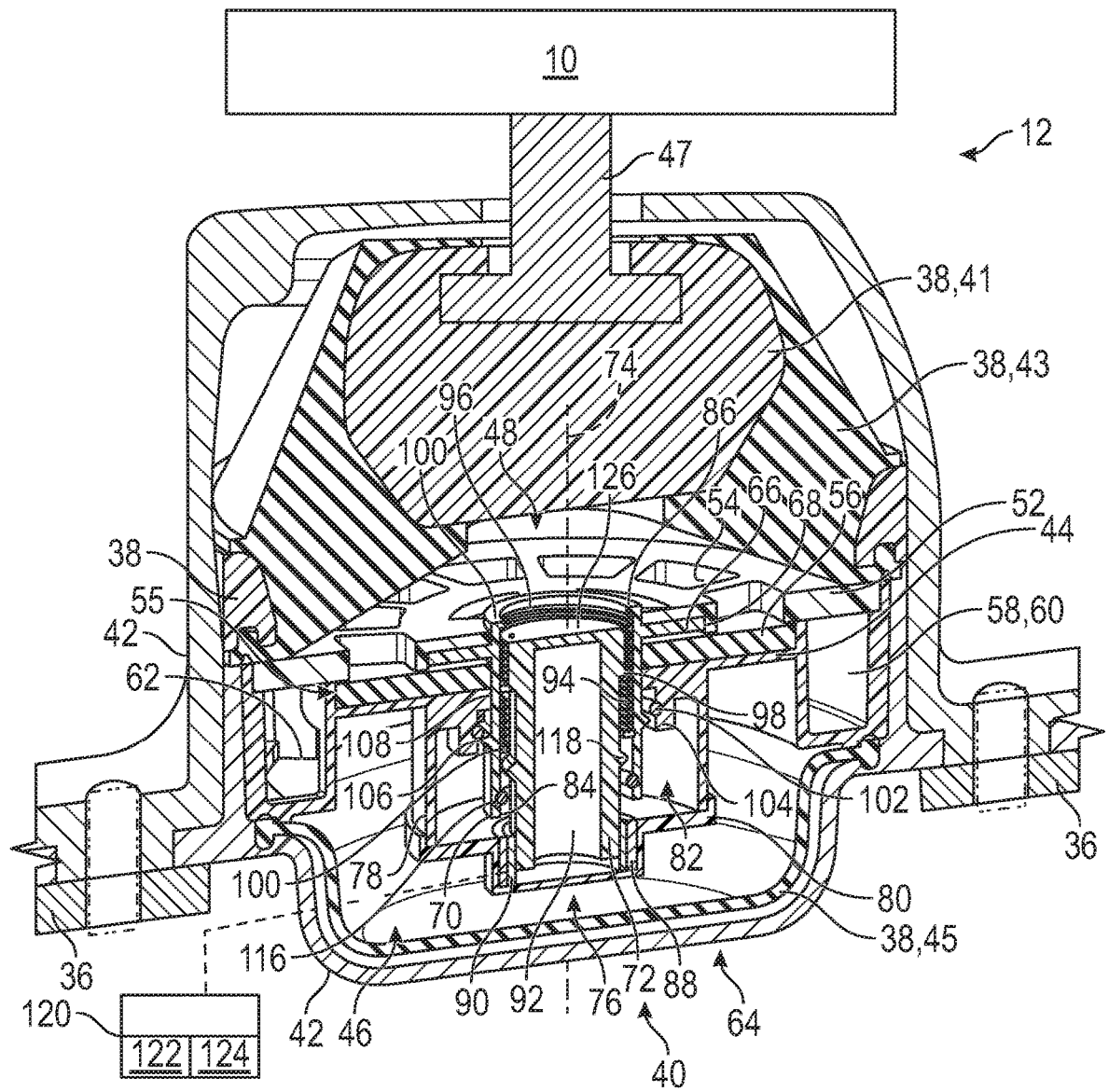
FIG. 2 is a schematic illustration of the powertrain, with a cross-sectional view of the hydraulic mount assembly and a structure that supports the powertrain.

Referring to the FIGS., wherein like numerals indicate like or corresponding parts throughout the several views, a powertrain 10 and a hydraulic mount assembly 12 are generally shown in FIGS. 1 and 2. As discussed in detail below, generally, the hydraulic mount assembly 12 may reduce vibrations from the powertrain 10 and other components. Any suitable number of hydraulic mount assemblies 12 may be used to support the powertrain 10, and the below discussion focuses on one hydraulic mount assembly 12 but it is to be appreciated that the discussion also applies to more than one hydraulic mount assembly 12.

Referring to FIG. 1, the powertrain 10 and the hydraulic mount assembly 12 may be used in a vehicle 14. Non-limiting examples of the vehicle 14 may include a car, a truck, a motorcycle, an off-road vehicle, a farm vehicle, a watercraft, an aircraft, or any other suitable moveable platform. Additionally, the vehicle 14 may be a diesel/gas-powered vehicle, a hybrid vehicle, an electric vehicle, etc. It is to be appreciated that alternatively, the powertrain 10 and the hydraulic mount assembly 12 may be used in a non-vehicle application, such as, farm equipment, stationary platforms, etc.

Continuing with FIG. 1, the vehicle 14 may include a body 16 having a passenger compartment 18 in which a passenger may enter and exit the vehicle 14. The body 16 of the vehicle 14 may also include an engine compartment 20 proximal to the passenger compartment 18. The vehicle 14 may also include a dynamic mass 21. The dynamic mass 21 may include a prime mover 22 that is housed in the engine compartment 20. Non-limiting examples of the prime mover 22 may include an engine such as an internal combustion engine, one or more electric motors, a combination of the engine and one or more of the electric motors, etc. Generally, the powertrain 10 may include the dynamic mass 21, and thus, the prime mover 22.

Continuing with FIG. 1, the vehicle 14 may also include a transmission 24 coupled to the prime mover 22. The transmission 24 and the prime mover 22 may include housing structures that are rigidly attached to each other, which create a larger dynamic mass 21 as compared to separating the mass of the transmission 24 and the mass of the prime mover 22. As such, in certain configurations, the dynamic mass 21 may include the prime mover 22 and/or the transmission 24 and/or one or more electric motors, etc.

For the electric or hybrid vehicle applications, the powertrain 10 may include one or more batteries that electrically connect to one or more of the electric motors to operate or power the electric motors that propel the vehicle 14, and therefore, the dynamic mass 21 of these types of vehicles 14 may include the batteries. Generally, the dynamic mass 21 of the vehicle 14 is any structure (mass) that is being supported via the hydraulic mount assembly 12.

Under certain operating conditions, such as during idling of the vehicle 14, the internal components of the prime mover 22 may move while the vehicle 14 remains stationary, and during this operating condition, it may be desirable to virtually decouple the dynamic mass of the vehicle 14 from the body 16 of the vehicle 14 via the hydraulic mount assembly 12. By decoupling the dynamic mass of the vehicle 14 from the body 16 of the vehicle 14, vibration transfer from the moving internal components of the prime mover 22 to the occupants of the vehicle 14 is reduced. Under other operating conditions, such as during motion of the vehicle 14, it may be desirable to operate different properties of the hydraulic mount assembly 12 through internal hydro-elastic properties of the hydraulic mount assembly 12. Additional improvements in vibration suppression may be realized by the controlled active features embedded in the hydraulic mount assembly 12, some of which are discussed below.

The prime mover 22 is configured to produce a torque. The transmission 24 is coupled to the prime mover 22 to receive the torque outputted from the prime mover 22. An input member is connected to the prime mover 22 to receive the torque from the prime mover 22, and the input member is rotatable to transfer the torque. An output member is coupled to the input member, and the output member is rotatable to transfer the torque from the prime mover 22. Generally, the output member is indirectly coupled to the input member. Therefore, various components, mechanisms, devices, structures, etc., may be disposed between the output member and the input member to couple these members together (which may couple these members together hydraulically, electronically, mechanically, etc., and combinations thereof). The prime mover 22 may include an output shaft (or crankshaft), and the input member may be coupled to the output shaft.

In certain configurations, the transmission 24 may include the input member and the output member. The output shaft of the prime mover 22 rotates at an engine speed, and the torque from rotation of the output shaft is transferred to the input member of the transmission 24, which causes the input member to rotate. The transmission 24 may include a final drive coupled to the input member and the output member that delivers output torque to one or more drive axles 26 through the final drive, and ultimately to wheels 28. One of the wheels 28 may be disposed near or proximal to each corner 30 of the vehicle 14. Therefore, the torque from the prime mover 22 is transferred to the transmission 24, and the transmission 24 outputs the output torque to drive the wheels 28. The vehicle 14 may be configured to drive front wheels 28 (e.g. a front-wheel drive (FWD) vehicle), rear wheels 28 (e.g. a rear-wheel drive (RWD) vehicle) or all wheels 28 (e.g. an all-wheel drive (AWD) vehicle). It is to be appreciated that the final drive may be driven by an endless rotatable member, and non-limiting examples of the endless rotatable member may include a belt or a chain.

The corners 30 of the vehicle 14 may include various parts from, for example, tie-rods outwardly. Therefore, as non-limiting examples, the parts of the corners 30 of the vehicle 14 may include one or more of tires, wheels 28, brake rotors, hubs, hub bearing assemblies, control arms, knuckles, bushings, etc.

Continuing with FIG. 1, one or more sensors 32 may be coupled to one or more of the wheels 28. In certain configurations, one of the sensors 32 is coupled to each one of the wheels 28. Generally, the sensors 32 may be used to determine speed of the wheel 28 and/or a relative angular position of the wheel 28. The speed of the wheel 28 may be used to detect vibrations at the respective wheels 28 and may provide a reference point for active suppression of periodic vibrations originating at the wheels 28. More specifically, as a non-limiting example, the sensors 32 may include a speed sensor 32 that may be used to detect periodic vibrations at the respective wheels 28 which is used to compile information regarding interior periodic vibrations attributable to the respective corners 30 of the vehicle 14. As other non-limiting examples, the sensors 32 may include a motion sensor, an angular speed sensor, etc. The motion sensor, for example, may be used to sense at least one of acceleration of the wheels 28, velocity of the wheels 28 and displacement of the wheels 28. Generally, the motion sensor is used in the vehicles 14 that are equipped with suspension systems featuring controlled passive damping devices using magnetorheological (MR) fluid, electrorheological (ER) fluid and other mechanical members such as control valves. The angular speed sensor, for example, may be used to sense the angular rotation speed of the wheels 28. In certain configurations, information from the sensors 32 may be communicated to a tracking filter 274 that uses this information in a control operation of the hydraulic mount assembly 12. It is to be appreciated that using the sensors 32 in conjunction with the hydraulic mount assembly 12 including the active features discussed herein eliminates the need to include any additional sensors on the vehicle 14, such as on the suspension system of the vehicle 14 and/or any additional sensors remotely located on the body 16 or the passenger compartment 18 of the vehicle 14, which thus, reduces costs.

When the vehicle 14 moves along the road 34, vibrations may enter the body 16 of the vehicle 14. For example, as the wheels 28 rotate along the road 34, vibrations from the interaction of the wheels 28 with the road 34 may enter the body 16 of the vehicle 14, and may be transferred to the powertrain 10 and/or the passenger compartment 18. Furthermore, operation of the powertrain 10, such as the prime mover 22, may cause vibrations that may be transferred to the passenger compartment 18. The hydraulic mount assembly 12 may reduce or suppress vibrations from the powertrain 10 and/or reduce or suppress vibrations from the wheels 28 in combination with the dynamic mass 21. Therefore, the hydraulic mount assembly 12 provides a reduction or minimization of vibrations felt in the passenger compartment 18 due to operation of the vehicle 14. The primary reduction of vibrations from the powertrain 10 versus the wheels 28 may occur during different modes of operation of the vehicle 14. For example, when the vehicle 14 is turned on and idling, the primary reduction of vibration of the powertrain 10 occurs in this situation. As another example, when the vehicle 14 is moving along the road 34, the primary reduction of vibration in the wheels 28 occurs in this situation.

Referring to FIG. 2, the powertrain 10 may include the prime mover 22, and the vehicle 14, which includes the powertrain 10, may include a structure 36 that supports the dynamic mass 21. As mentioned above, the dynamic mass 21 may include the prime mover 22, and thus, the structure 36 may support the prime mover 22. The transmission 24 may also be supported via the structure 36. The structure 36 may be a cradle, a frame, a support or any other structure that supports the powertrain 10 or components to operate the powertrain 10 such as the batteries for the electric vehicle application. Generally, the structure 36 is disposed beneath the powertrain 10, and specifically, beneath the prime mover 22, the transmission 24, the batteries if using the electric or hybrid vehicle applications, etc. Therefore, the hydraulic mount assembly 12 is operable between the powertrain 10 and the structure 36. For example, generally, the hydraulic mount assembly 12 is attached to the structure 36 and supports the dynamic mass 21. More specifically, the hydraulic mount assembly 12 may be operable between the prime mover 22 and the structure 36. For the electric or hybrid vehicle applications, the hydraulic mount assembly 12 may support the structure 36 that supports the batteries, and thus, the hydraulic mount assembly 12 may be operable between the batteries and the structure 36.

Referring to FIG. 2, the hydraulic mount assembly 12 includes a mount body 38 defining a cavity 40. Generally, the mount body 38 is attached to the structure 36. In certain configurations, a cover 42 may be disposed around the mount body 38, and the cover 42 may be directly attached to the structure 36. As such, the mount body 38 may be indirectly attached to the structure 36. The cover 42 may provide a rigid structure that houses various components discussed herein.

Figure 8:
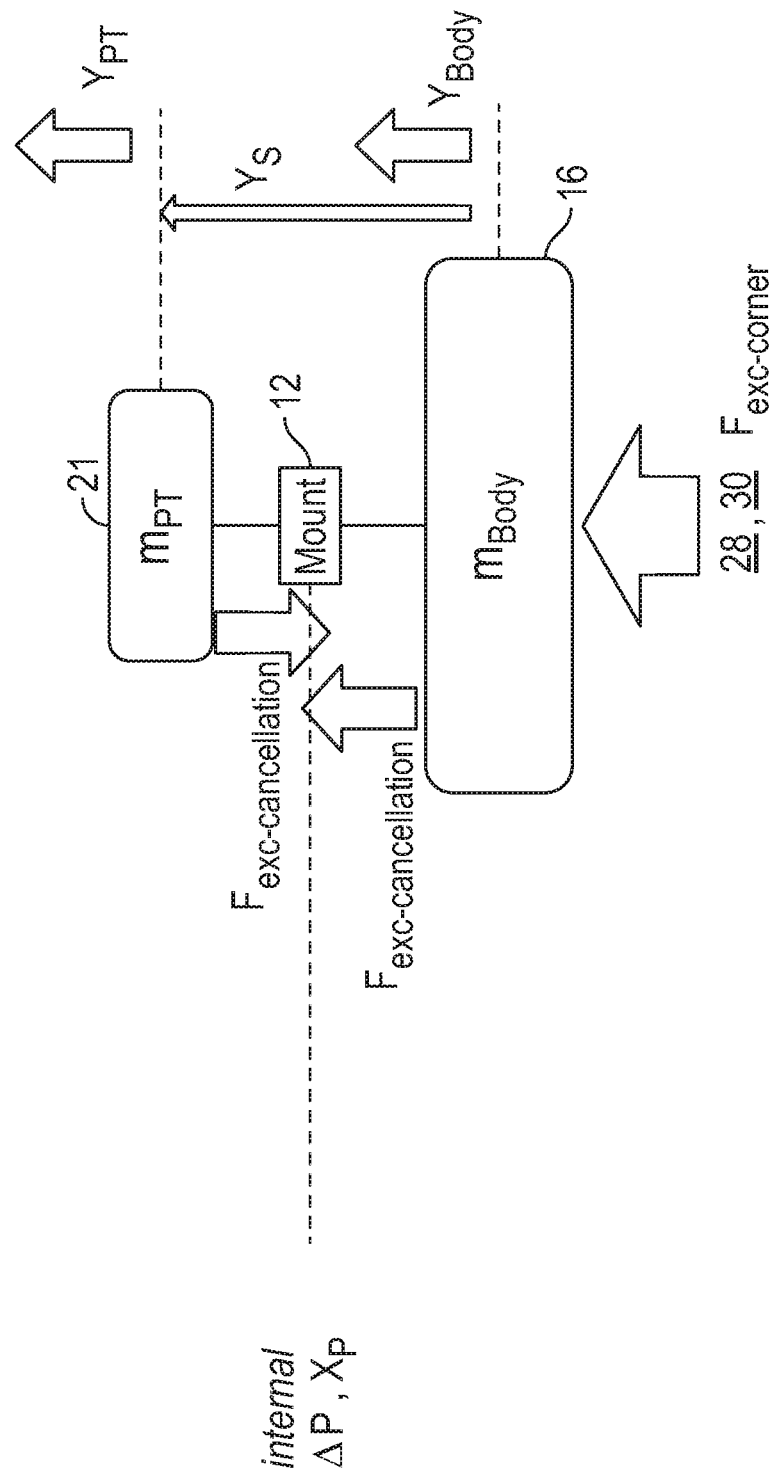
FIG. 8 is a schematic illustration of the hydraulic mount assembly positioned between the dynamic mass and a body of a vehicle.

Continuing with FIG. 2, the mount body 38 may include a first portion 41 and a second portion 43 secured to each other, and forms an upper boundary of the cavity 40. The mount body 38 may include a third portion 45, which may be referred to as a bladder, spaced from the first and second portions 41, 43, and forms a lower boundary of the cavity 40. The first and second portions 41, 43 may be movable together in response to one or more forces $F_{exe\text{-}cancellation}$ (see FIG. 8), which for example, the second portion 43 may dynamically deflect. The third portion 45 is movable in response to movement of the fluid which is caused by relative movement of the first portion 41 and the structure 36.

The first and second portions 41, 43 may be formed of a material that has damping features, and non-limiting examples of the materials may include one or more of polymer(s), nylon(s), rubber(s), composite(s), etc. The third portion 45 may be formed of a material that has flexible features, and non-limiting examples of the materials may include one or more of polymer(s), rubber(s), etc.

The hydraulic mount assembly 12 may include a post 47 that is secured to the first portion 41 of the mount body 38 and the powertrain 10. Depending on the direction of the force $F_{exe\text{-}cancellation}$, the first, second, and third portions 41, 43, 45 may move relative to the cavity 40.

Figure 5:
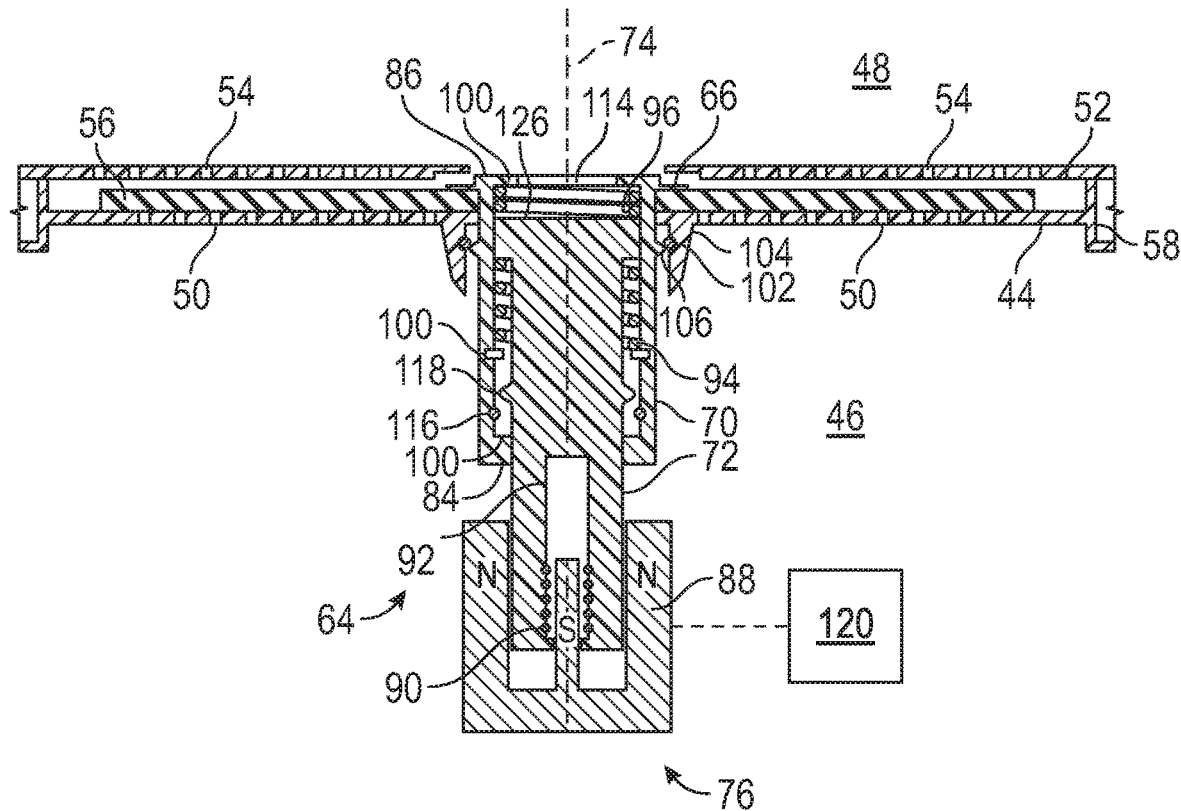
FIG. 5 is a schematic illustration of a third mode of operation of the hydraulic mount assembly.
Figure 3:
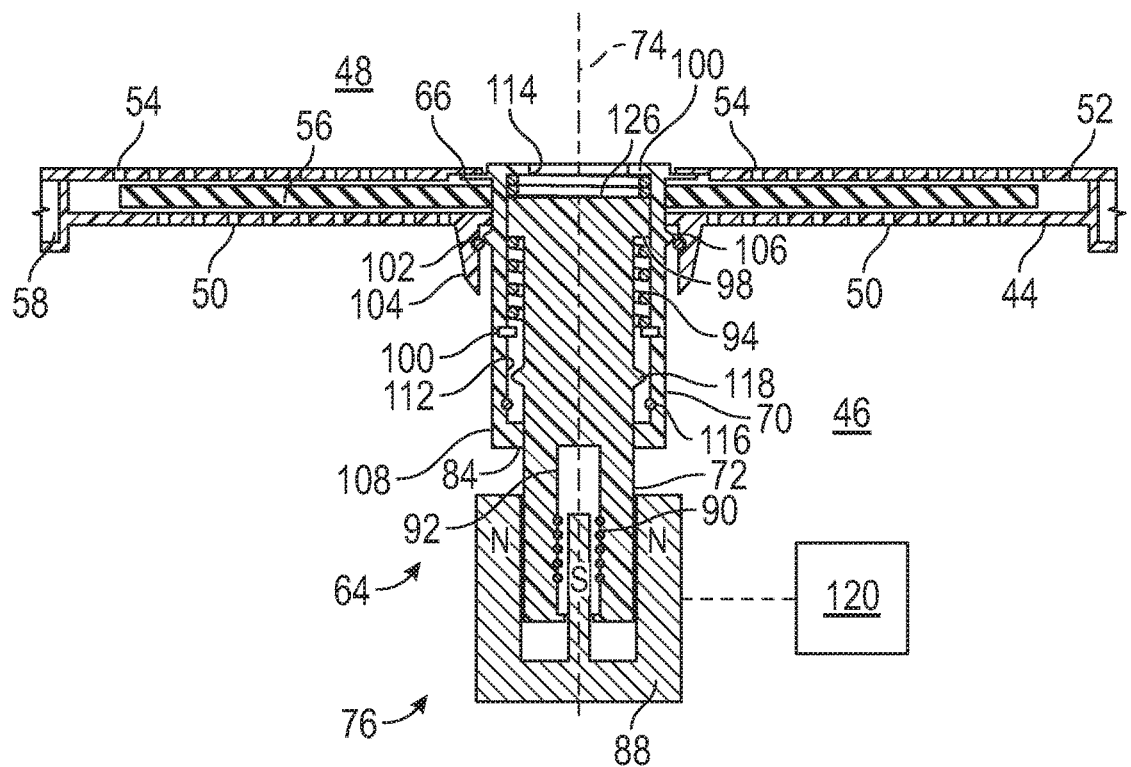
FIG. 3 is a schematic illustration of a first mode of operation of the hydraulic mount assembly.
Figure 4:
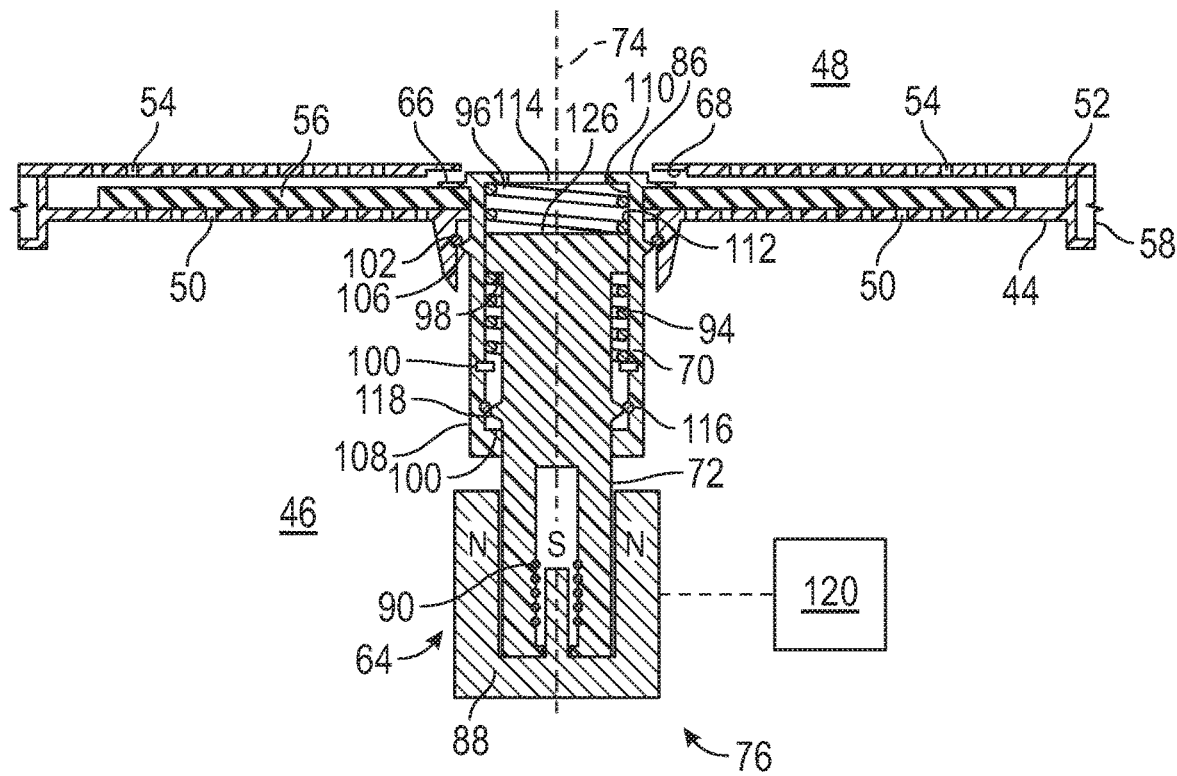
FIG. 4 is a schematic illustration of a second mode of operation of the hydraulic mount assembly.

Referring to FIGS. 3-5, the hydraulic mount assembly 12 also includes a first plate 44 fixed relative to the mount body 38 inside the cavity 40 to separate the cavity 40 into a first chamber 46 and a second chamber 48. The third portion 45 may form the lower boundary of the first chamber 46, and the first and second portions 41, 43 may form the upper boundary of the second chamber 48. In certain configurations, the first plate 44 is directly or indirectly fixed to the cover 42. The third portion 45 and the first plate 44 may further define the second chamber 48. The first and second chambers 46, 48 contain a fluid, and more specifically a liquid fluid. Therefore, non-limiting examples of the fluid may include an oil, hydraulic fluid, etc. The fluid may pass between the first and second chambers 46, 48 in certain situations due to changing pressure in the respective chambers 46, 48 in order to suppression of vibrations.

Generally, when the force $F_{exe\text{-}cancellation}$ is applied to the mount body 38, the first and second chambers 46, 48 may expand and contract depending on different pressures in the chambers 46, 48. For example, when the force $F_{exe\text{-}cancellation}$ is applied to the mount body 38 through the post 47 in one direction, the first and second portions 41, 43 may cause the first chamber 46 to decrease in size which forces the fluid out of the first chamber 46 and into the second chamber 48 which increases the size of the second chamber 48. As another example, when the force $F_{exe\text{-}cancellation}$ is applied to the mount body 38 in an opposite direction, the first and second portions 41, 43 may cause the second chamber 48 to decrease in size which forces the fluid out of the second chamber 48 and into the first chamber 46 to increase in size.

It is to be appreciated that the hydraulic mount assembly 12 may be configured as a single-action mount body or a dual-action mount body. For illustrative purposes the single-action mount body is illustrated in FIG. 2. In the dual-action mount body, the third portion 45, i.e., the bladder, is replaced with a stiffer structure, such as the structure for the first and second portions 41, 43. Therefore, in the dual-action mount body, the structure that forms the upper boundary of the cavity 40 and the post 47 may be mirrored to the location of the bladder.

As best shown in FIGS. 3-5, the first plate 44 defines a plurality of first passages 50 that fluidly connects the first and second chambers 46, 48. Furthermore, the hydraulic mount assembly 12 may also include a second plate 52 fixed relative to the mount body 38 inside the cavity 40 to further separate the cavity 40 into the first and second chambers 46, 48. In certain configurations, the second plate 52 is directly or indirectly fixed to the cover 42. The first and second portions 41, 43 and the second plate 52 may further define the first chamber 46. The second plate 52 defines a plurality of second passages 54 that fluidly connects the first and second chambers 46, 48.

Referring to FIGS. 2-5, the first and second plates 44, 52 are spaced from each other to define an intermediate chamber 55 (55 numbered in FIG. 2). The hydraulic mount assembly 12 further includes a decoupler 56 disposed between the first chamber 46 and the second chamber 48. In certain configurations, the decoupler 56 is disposed between the first and second plates 44, 52. As such, in certain configurations, the decoupler 56 is disposed in the intermediate chamber 55 between the first and second plates 44, 52. Generally, the decoupler 56 overlaps the first plate 44. More specifically, the decoupler 56 overlaps the first passages 50. Various features of the hydraulic mount assembly 12 may be rearranged such that the decoupler 56 may overlap the second plate 52, and more specifically, overlap the second passages 54. The decoupler 56 operates to prevent fluid flow to the first and second chambers 46, 48 via the first and second plates 44, 52 in certain situations.

As discussed further below, in certain situations, the decoupler 56 is free to move relative to the first and second plates 44, 52 within the intermediate chamber 55, which allows fluid communication between the first and second passages 50, 54 via the intermediate chamber 55, in which the fluid displaces the decoupler 56 without causing any appreciable hydraulic action through the first and second chambers 46, 48. It is to be appreciated that the flow of the fluid around the outer edge of the decoupler 56 may be small. Therefore, the decoupler 56 is displaceable in the intermediate chamber 55 during fluid communication between the first and second chambers 46, 48 via the first and second passages 50, 54. When the decoupler 56 is free to move back and forth relative to the first and second plates 44, 52, this generally causes pressure in the first and second chambers 46, 48 to substantially equalize.

In other situations, as discussed further below, the decoupler 56 is locked onto the first plate 44 which prevents fluid communication between the first and second passages 50, 54; and in this situation, hydraulic action occurs between the first and second chamber 46, 48 through an inertia track 58 (see FIG. 2). The inertia track 58 is disposed between the mount body 38 and the first plate 44. The inertia track 58 defines a passageway 60 that forms a track between the first and second chambers 46, 48. The passageway 60 is separate from the first passages 50 and the second passages 54. The passageway 60 allows the fluid to flow between the first and second chambers 46, 48 via the inertia track 58. The passageway 60 generally forms a ring which causes the fluid to travel circularly or spirally through the inertia track 58 until the fluid reaches a port 62. For example, there may be one port 62 in direct communication with the first chamber 46 and another port 62 in direct communication with the second chamber 48. When the decoupler 56 is locked onto the first plate 44, a greater pressure occurs in one of the first and second chambers 46, 48 as compared to the other one of the first and second chambers 46, 48. The flow of the fluid through the inertia track 58, when considered with the dynamic volumetric expansion and compression of the first and second chambers 46, 48, arises from the presences of pressure differences between the first and second chambers 46, 48. The pressure differences in the chambers 46, 48 act on an effective termination area (the effective termination area is the effective area that pressure is exerted in the respective first and second chambers 46, 48 to produce forces at the connection ends, and the connection ends here are the powertrain 10 and the structure 36) of the respective powertrain 10 and the structure 36 which creates a dynamic force between the powertrain 10 and the structure 36. The dynamic force may be of sufficient magnitude and proper polarity to suppress vibrations in the body 16 of the vehicle 14 from other sources. Various features of the hydraulic mount assembly 12 may be rearranged such that the decoupler 56 may overlap the second plate 52, and more specifically, overlap the second passages 54, and in this configuration, the decoupler 56 may lock onto the second plate 52 instead of the first plate 44, and operate similar to the discussion above, and therefore, will not be repeated.

Continuing with FIGS. 2-5, the hydraulic mount assembly 12 also includes an actuator 64 coupled to the first plate 44. The actuator 64 is operable in a first mode, a second mode, and a third mode. Operation of the actuator 64 provides an active system to minimize vibrations in the body 16 of the vehicle 14 through the hydraulic mount assembly 12. Said differently, the hydraulic mount assembly 12 is actively adjustable in response to the actuator 64 to minimize vibrations to the passenger compartment 18. For example, depending on the road conditions, the hydraulic mount assembly 12 may be adjusted via the actuator 64 to maximize vibration suppression. The actuator 64 may be referred to as a voice coil actuator (VCA).

The first mode is illustrated in FIG. 3, and may also be referred to an idle mode in which the prime mover 22 is running but the vehicle 14 is not moving. Therefore, in the first mode, vibrations in the body 16 occur at a minimal level. With regard to the electric or hybrid vehicle application, when the vehicle 14 is in the idle mode, the prime mover 22 may be off, and thus no vibrations may occur internally in the vehicle 14.

The second mode is illustrated in FIG. 4, and may also be referred to as a rough road mode in which the road 34 has recesses or bumps that oscillate the vehicle 14 as the vehicle 14 travels over the bumps. Therefore, in the second mode, vibrations in the body 16 occur at an appreciable level, but this level of vibrations is managed via the hydraulic action of the fluid moving through the inertia track 58.

The third mode is illustrated in FIG. 5, and may also be referred to as a smooth road shake (SRS) mode in which the road 34 has minimal recesses or bumps (such as a smooth asphalt or paved road 34 without potholes) that oscillates the vehicle 14 in a periodic pattern related to a frequency produced due to rotation of the wheels 28. The vibration level of the third mode is less than the second mode.

As will be discussed further below, information from the sensors 32 at the wheels 28 is used to determine whether the actuator 64 should operate in the first mode, the second mode, or the third mode.

The decoupler 56 is movable between a locked position (see FIGS. 4 and 5) and an unlocked position (see FIG. 3) in response to actuation of the actuator 64. Therefore, depending on which mode the actuator 64 is operating in, the decoupler 56 may allow fluid communication through the first passages 50 or prevent fluid communication through the first passages 50.

Generally, the decoupler 56 is in the locked position when the actuator 64 is in the second or rough road mode or the third or SRS mode because there are forces occurring between the dynamic mass 21 and/or the prime mover 22 and the structure 36 by which vibrations of the body 16 and the passenger compartment 18 may be suppressed. The decoupler 56 abuts the first plate 44 when in the locked position to prevent fluid communication through the first passages 50. When the decoupler 56 is in the locked position, hydraulic action occurs between the first and second chambers 46, 48 through the inertia track 58, thus damping vibrations between the powertrain 10 and the structure 36, and/or damping vibrations to the passenger compartment 18.

Generally, the decoupler 56 is in the unlocked position when the actuator 64 is in the first or idle mode when there are minimal forces occurring between the prime mover 22 and the structure 36 in response to excitation sources, such as, operation of the prime mover 22. The vibrations that may occur when in the first mode due to idling of the prime mover 22 are generally small in amplitude and the decoupler 56 is movable between the plates 44, 52 to displace the fluid in the intermediate chamber 55 to the respective chambers 46, 48, and thus, reduce transmission of the vibrations from the prime mover 22 to the passenger compartment 18 via fluctuation of the decoupler 56 and not the flow of fluid through the inertia track 58. The decoupler 56 is movable relative to the first plate 44 when in the unlocked position to allow fluid communication through the first passages 50. Therefore, when the decoupler 56 is in the unlocked position, the decoupler 56 is free to move relative to the first plate 44 and the second plate 52 inside the intermediate chamber 55. The decoupler 56 allows fluid communication between the first and second passages 50, 54 via the intermediate chamber 55 when the decoupler 56 is in the unlocked position. As such, the decoupler 56 is disposed in the unlocked position to allow a degree of free movement of the decoupler 56 between the first and second plates 44, 52, which may occur when the actuator 64 is in the first mode.

When the decoupler 56 is in the unlocked position, no appreciable hydraulic action occurs between the first and second chambers 46, 48 via the inertia track 58, and pressure is substantially equalized between the first and second chambers 46, 48. Therefore, movement of the fluid occurs through the first and second passages 50, 54 when the decoupler 56 is free to move between the first and second plates 44, 52, but minimal movement of the fluid occurs through the inertia track 58 when in the first mode. This movement of the decoupler 56 reduces transmissibility of small displacement vibrations.

Next, the details of the actuator 64 will be addressed. FIGS. 2-5 illustrate features of the actuator 64, among other features. It is to be appreciated that FIGS. 3-5 are schematic illustrations to show various features more clearly.

Turning to FIGS. 2-5, in certain configurations, the actuator 64 may include a flange 66 that overlaps a portion of the decoupler 56. The flange 66 may be disposed between the decoupler 56 and the second plate 52. The flange 66 is movable to pinch the decoupler 56 between the flange 66 and the first plate 44 when the decoupler 56 is in the locked position. Optionally, the second plate 52 may define a pocket 68 (see FIG. 2) to contain the flange 66. It is to be appreciated that the flange 66 may be any suitable length that overlaps the decoupler 56 in order to abut the decoupler 56 to the first plate 44 when the decoupler 56 is in the locked position. Furthermore, the flange 66 may be any suitable configuration and any suitable number of flanges 66 may be used, and non-limiting examples may include a disk, a plurality of spaced apart flanges of the same or different lengths, etc.

Referring to FIGS. 2-5, the actuator 64 may also include a casing 70 and a plug 72 disposed in the casing 70. Generally, the casing 70 is surrounded by the first and second plates 44, 52 and the decoupler 56. Therefore, the plug 72 is also surrounded by the first and second plates 44, 52 and the decoupler 56. Both of the casing 70 and the plug 72 are movable depending on actuation of the actuator 64. The plug 72 and the casing 70 are movable relative to the first and second plates 44, 52. In certain situations, the plug 72 and the casing 70 are movable independently of each other.

Generally, the flange 66 extends outwardly from the casing 70 to overlap the portion of the decoupler 56. Therefore, the flange 66 may be fixed to the casing 70, and thus, the flange 66 and the casing 70 are movable together as a unit. The casing 70 and the flange 66 are movable relative to the first and second plates 44, 52 during actuation of the actuator 64.

The casing 70 is movable between an initial position (see FIG. 3) and a secondary position (see FIGS. 4 and 5). As best shown by comparing FIGS. 3-5, the initial position and the secondary position of the casing 70 are different from each other. When the casing 70 is in the initial position, the flange 66 is positioned closer to the second plate 52 than to the first plate 44 which allows the degree of free movement of the decoupler 56 between the first and second plates 44, 52. When the casing 70 is in the secondary position, the flange 66 pinches the decoupler 56 to the first plate 44. The casing 70 is movable relative to the first plate 44 depending on whether the actuator 64 is operating in the first mode, the second mode, or the third mode.

Turning to the plug 72, the plug 72 is movable between a first position (see FIG. 3), a second position (see FIG. 4) and a third position (see FIG. 5). Generally, the plug 72 is movable between the first, second, and third positions along a longitudinal axis 74. As best shown by comparing FIGS.

3-5, the first, second, and third positions of the plug 72 are different from each other relative to the casing 70. The plug 72 is movable relative to the casing 70 depending on whether the actuator 64 is operating in the first mode, the second mode, or the third mode.

Referring to FIGS. 2-5, the actuator 64 may further include a magnetic apparatus 76 that cooperates with the plug 72. Actuation of the actuator 64 energizes the magnetic apparatus 76 which causes the plug 72 to move to one of the first position, the second position, and the third position. Part of the magnetic apparatus 76 may be fixed relative to the first plate 44 and another part of the magnetic apparatus 76 may be secured to the plug 72.

Specifically, the first plate 44 may include a wall 78 that extends into the first chamber 46 away from the second plate 52, and the wall 78 generally surrounds the casing 70 and the plug 72. Furthermore, the wall 78 may be spaced from and surround the longitudinal axis 74.

The magnetic apparatus 76 may include a cap 80 secured to the wall 78 to enclose part of the casing 70 and the plug 72 in a sub-chamber 82. The sub-chamber 82 also contains the fluid. For example, the casing 70 may include a first end 84 and a second end 86 spaced from each other relative to the longitudinal axis 74, and the first end 84 may face the cap 80 and be spaced from the cap 80. The first end 84 of the casing 70 may be open. The flange 66 may be disposed closer to the second end 86 of the casing 70 than to the first end 84 of the casing 70.

As best shown in FIGS. 2-5, the magnetic apparatus 76 may include one or more magnets 88 or magnetic material 88, that are supported by the cap 80, and the magnetic apparatus 76 may include one or more coils 90 supported by the plug 72. Alternatively, the magnet(s) 88/the magnetic material 88 may be supported by the plug 72, and the coils 90 supported by the cap 80. Regardless of which part the magnet(s) 88 and the coils 90 are attached to, actuation of the actuator 64 causes current to flow through the coils 90 which magnetically interacts with the magnets 88 which cause the plug 72 to move to one of the first, second, and third positions. As one non-limiting example, as shown in FIGS. 3-5 a north pole (N) of the magnet 88 may surround the plug 72 and a south pole (S) of the magnet 88 may be disposed inside the plug 72 such that the coils 90 of the plug 72 surround the south pole (S). It is to be appreciated that the magnets 88 may be placed such that the poles are reversed (for example, the south pole (S) disposed outside of the plug 72 and the north pole (N) inside the plug 72) in the FIGS., and generally, the magnets 88 may be placed in any suitable orientation, and the FIGS. are non-limiting examples.

In certain configurations, the plug 72 may define an orifice 92 that receives part of the magnet 88, such as the part of the magnet 88 that creates the south pole (S) is disposed in the orifice 92. Additionally, the coils 90 may be secured to the plug 72 inside the orifice 92, and therefore, the coils 90 and the plug 72 may move as a unit. It is to be appreciated that the fluid may be disposed inside the orifice 92.

As best shown in FIGS. 2-5, the actuator 64 may include a first biasing member 94 and a second biasing member 96 coupled to the plug 72 which centers the plug 72 relative to the casing 70 when the plug 72 is unlocked from the casing 70. Generally, the first and second biasing members 94, 96 apply a biasing force to the plug 72 in opposite directions which positions the plug 72 in a central position. The amount of biasing force that the first and second biasing members 94, 96 apply to the plug 72 may be the same or different depending on the desired application. The first and second biasing members 94, 96 may be any suitable configuration, and non-limiting examples may include a spring, etc.

Continuing with FIGS. 2-5, the plug 72 may include a lip 98, with the first biasing member 94 disposed along one side of the lip 98 and the second biasing member 96 disposed along another side of the lip 98. Furthermore, the casing 70 may include one or more stops 100 to provide one or more surfaces for the first and second biasing members 94, 96 to react against. The stops 100 also prevent the plug 72 from separating from the casing 70 during the energization of the magnetic apparatus 76.

The first plate 44, the casing 70, and the plug 72 may include some additional features to position the casing 70 and the plug 72 in a desired orientation in response to energizing the magnetic apparatus 76. When the magnetic apparatus 76 is de-energized, the additional features maintain the general orientation of the casing 70, and depending on the situation, the plug 72, which will be explained further below. Once the desired mode is selected, in certain situations, such as the first and third modes, the magnetic apparatus 76 may be energized/de-energized to produce a magnetic force via the magnets 88 and the coils 90 that is continuously varied to apply a controlled force to the plug 72. The plug 72 may be actively movable via the magnetic apparatus 76 when the actuator 64 is in the first mode or the third mode.

A controller 120 (discussed in detail below) may be in communication with the magnetic apparatus 76, and the controller 120 may use information regarding a pressure differential $\Delta P$ (of FIG. 8) between the first and second chambers 46, 48 and the magnetic force from energizing the magnetic apparatus 76 to control active movement of the plug 72. This dynamic action of the plug 72 may suppress targeted periodic vibrations at a predetermined frequency of rotation of the wheels 28 or the periodic rotation frequency of the dynamic mass 21 and/or prime mover 22, which will also be discussed further below.

Continuing with FIGS. 2-5, the first plate 44 may include a first detent 102 which may protrude outwardly toward the casing 70. In certain configurations, the first detent 102 faces the casing 70 and surrounds the casing 70. The first detent 102 may be fixed to the first plate 44, and thus, may remain stationary with the first plate 44. Furthermore, the first detent 102 may be any suitable configuration and one non-limiting example of the first detent 102 may include an o-ring, a clip, a ring, a structure machined into the first plate 44, a molding structure that is integral with the first plate 44, any structure that protrudes outwardly, etc. Furthermore, the first detent 102 may be continuous about the first plate 44 or a plurality of first detents 102 may be spaced apart from each other about the first plate 44.

Optionally, the first plate 44 may include a strip 104 that surrounds the casing 70, and the first detent 102 may be fixed to the strip 104. The strip 104 may be disposed between the wall 78 and the casing 70.

Continuing with FIGS. 2-5, the casing 70 may include a first protrusion 106 which may protrude outwardly toward the inertia track 58. More specifically, the casing 70 may include an outer surface 108, and the first protrusion 106 may protrude outwardly from the outer surface 108. The outer surface 108 may face away from the longitudinal axis 74. Furthermore, the outer surface 108 may be spaced from and surround the longitudinal axis 74. The flange 66 may also extend outwardly from the outer surface 108.

The first protrusion 106 may be fixed to the outer surface 108 of the casing 70, and thus, the first protrusion 106 and the casing 70 are movable together as a unit. Additionally, the first protrusion 106 faces the first detent 102. The first protrusion 106 is movable with the casing 70 relative to the first detent 102 of the first plate 44 depending on actuation of the actuator 64. Generally, the first protrusion 106 of the casing 70 is movable across the first detent 102 of the first plate 44 between the initial position and the secondary position. The first protrusion 106 may be any suitable configuration and one non-limiting example of the first protrusion 106 may include an o-ring, a clip, a ring, a structure machined into the casing 70, a molding structure that is integral with the casing 70, any structure that protrudes outwardly, etc. Furthermore, the first protrusion 106 may be continuous about the casing 70 or a plurality of first protrusions 106 may be spaced apart from each other about the casing 70.

Referring to FIG. 3, the first protrusion 106 of the casing 70 is disposed between the decoupler 56 and the first detent 102 when the casing 70 is in the initial position. Specifically, the first protrusion 106 is sandwiched between part of the first plate 44 and the first detent 102. In this position, the flange 66 allows the decoupler 56 to move between the first and second plates 44, 52 when the casing 70 is in the initial position.

Specifically, referring to FIG. 3, when the actuator 64 is actuated to operate in the first mode, the magnetic apparatus 76 is energized to move the plug 72 to the first position which correspondingly moves the flange 66 of the casing 70 toward the second plate 52 and moves the first protrusion 106 of the casing 70 between the first detent 102 and the decoupler 56. The magnetic apparatus 76 is energized with a strong magnetic force or action that causes the plug 72 to apply a force to the casing 70 to move the casing 70 to the initial position. Therefore, the casing 70 is locked to the first plate 44 in the initial position. When the magnetic apparatus 76 is de-energized, the casing 70 remains locked in the initial position due to the position of the first protrusion 106 relative to the first detent 102. Also, when the magnetic apparatus 76 is de-energized, the plug 72 generally returns to the central position because the plug 72 is not locked when in the first mode. While the plug 72 is unlocked or generally in the central position but the plug 72 is to be actively movable in the first mode, then the casing 70 is locked in the secondary position to lock the decoupler 56 in the locked position, and the magnetic apparatus 76 may be energized to apply a controlled continuous or varied force to the plug 72 via the amount of the current being delivered through the coils 90, which causes fluctuation of the plug 72 during the first mode. This dynamic or active action of the plug 72 may suppress targeted periodic vibrations at a predetermined frequency of rotation of the internal components of the prime mover 22 when in the first mode since the wheels 28 are not moving.

Referring to FIGS. 4 and 5, the first protrusion 106 of the casing 70 is movable over the first detent 102 away from the decoupler 56 when the casing 70 is in the secondary position. Therefore, the casing 70 is now locked to the first plate 44 in a different position. The flange 66 pinches the decoupler 56 to the first plate 44 when the casing 70 is in the secondary position.

Specifically, referring to FIGS. 4 and 5, when the actuator 64 is actuated to switch to the second or third modes, the magnetic apparatus 76 is energized to move the plug 72 to the second or third positions which correspondingly move the flange 66 of the casing 70 toward the first plate 44 such that the first protrusion 106 of the casing 70 passes over the first detent 102 away from the decoupler 56. The magnetic apparatus 76 is energized with a strong magnetic force or action that causes the plug 72 to apply a force to the casing 70 in an opposite direction from the first mode (when the casing 70 is in the initial position), to move the casing 70 to the secondary position. Therefore, the casing 70 is locked to the first plate 44 in the secondary position. When the magnetic apparatus 76 is de-energized, the casing 70 remains in the secondary position due to the position of the first protrusion 106 relative to the first detent 102. When the magnetic apparatus 76 is de-energized, the plug 72 generally returns to the central position because the plug 72 is not locked when in the third mode, but will not return to the central position when in the second mode which is discussed further below. While the plug 72 is unlocked or generally in the central position, the magnetic apparatus 76 may be energized to apply the controlled continuous or varied force to the plug 72 via the amount of the current being delivered through the coils 90, which causes fluctuation of the plug 72 during the third mode. This dynamic or active action of the plug 72 may suppress targeted vibrations at the periodic frequency produced due to rotation of the wheels 28 when in the third mode.

Referring back to FIGS. 2-5, the casing 70 may define an opening 110 that is surrounded by an inner surface 112 of the casing 70. The plug 72 is disposed inside or housed within the opening 110. The inner surface 112 may face the longitudinal axis 74 and is spaced from the longitudinal axis 74. Furthermore, the outer surface 108 surrounds the inner surface 112 and the opening 110. The outer surface 108 of the casing 70 and the inner surface 112 of the casing 70 oppose each other. Part of the plug 72 is disposed in the opening 110 and is movable relative to the inner surface 112 inside the opening 110 between the first, second, and third positions. Another part of the plug 72 is disposed outside of the casing 70 to interact with the magnetic apparatus 76, and specifically, interact with the magnet 88 of the magnetic apparatus 76. The opening 110 may be open to the subchamber 82 and the second chamber 48, and thus, the fluid may be disposed in the opening 110.

The lip 98 of the plug 72 may engage the inner surface 112 of the casing 70. Therefore, for example, when the plug 72 moves toward the second end 86 of the casing 70, some of the fluid may be pushed into the second chamber 48 through a slot 114 proximal to one of the stops 100 of the casing 70. As another example, when the plug 72 moves toward the first end 84 of the casing 70, by active control or through action of the pressure differential between the first and second chambers 46, 48, some of the fluid may be pulled into the opening 110 through the slot 114, and thus, pushes some of the fluid out of the second chamber 48.

Continuing with FIGS. 2-5, the inner surface 112 of the casing 70 may include a second protrusion 116 which may protrude outwardly toward the plug 72. In certain configurations, the second protrusion 116 faces the longitudinal axis 74. The first and second protrusions 106, 116 of the casing 70 are offset from each other relative to the longitudinal axis 74. For example, the first protrusion 106 may be disposed closer to the decoupler 56 than the second protrusion 116 is to the decoupler 56. Said differently, the second protrusion 116 is disposed closer to the magnetic apparatus 76 than the first protrusion 106 is to the magnetic apparatus 76. The second protrusion 116 may be fixed to the inner surface 112 of the casing 70, and thus, the casing 70 and the second protrusion 116 are movable together as a unit.

The second protrusion 116 may be any suitable configuration and one non-limiting example of the second protrusion 116 may include an o-ring, a clip, a ring, a structure machined into the casing 70, a molding structure that is integral with the casing 70, any structure that protrudes outwardly, etc. Furthermore, the second protrusion 116 may be continuous about the casing 70 or a plurality of second protrusions 116 may be spaced apart from each other about the casing 70.

Continuing with FIGS. 2-5, the plug 72 may include a second detent 118 which may protrude outwardly toward the inner surface 112 of the casing 70. Generally, the second detent 118 of the plug 72 is disposed on one side of the second protrusion 116 when the plug 72 is in the first and third positions, and the second detent 118 of the plug 72 is disposed on another side of the second protrusion 116 when the plug 72 is in the second position. The second detent 118 of the plug 72 is disposed between the decoupler 56 and the second protrusion 116 when the plug 72 is in the first and third positions. The second detent 118 of the plug 72 is movable over the second protrusion 116 away from the decoupler 56 when the plug 72 is in the second position.

The second detent 118 may be any suitable configuration and one non-limiting example of the second detent 118 may include an o-ring, a clip, a ring, a structure machined into the plug 72, a molding structure that is integral with the plug 72, any structure that protrudes outwardly, etc. Furthermore, the second detent 118 may be continuous about the plug 72 or a plurality of second detent 118 may be spaced apart from each other about the plug 72. It is to be appreciated that the first and second protrusions 106, 116 may be the same configurations or different configurations relative to each other, and additionally, the first and second detents 102, 118 may be the same configurations or different configurations relative to each other. In the FIGS., for illustrative purposes, the first detent 102 and the second protrusion 116 have generally the same configuration relative to each other and the first protrusion 106 and the second detent 118 have generally the same configuration relative to each other.

As discussed above, operation of the hydraulic mount assembly 12 is an active system. Therefore, depending on the road conditions and/or vehicle situation, the actuator 64 may be operated in one of the modes in order to reduce or minimize the vibrations felt in the passenger compartment 18. The controller 120 may be used to control the operation of the actuator 64 in order to reduce or minimize the vibrations felt in the passenger compartment 18. The controller 120 may be in electrical communication with the actuator 64, and more specifically, with the magnetic apparatus 76. The controller 120 may also collect and/or use information regarding the pressure differential between the first and second chambers 46, 48 and the magnetic force from energizing the magnetic apparatus 76 to control dynamic/active movement of the plug 72.

Therefore, for example, the controller 120 may control and monitor which mode the actuator 64 is operating in, e.g., the first mode, the second mode, and the third mode. Additionally, the controller 120 may control and monitor the magnetic apparatus 76 to cause fluctuation of the plug 72 during the first mode due to the periodic rotation frequency of the prime mover 22 and the third mode due to the periodic vibrations at the predetermined frequency of rotation of the wheels 28. Simply stated, in certain situations, the magnetic apparatus 76 may be energized to change the amount of the current through the coils 90 which changes the magnetic force or action that causes dynamic/active movement of the plug 72. The controller 120 may also be in electrical communication with the sensors 32 at the wheels 28 either directly or through a controller area network (CAN) system, and/or may also be in electrical communication with a sensor in the first and second chambers 46, 48 to determine/collect/monitor/use the pressure differential between the chambers 46, 48. The controller 120 may use the information gathered by the sensors 32 at the wheels 28, and/or sensors of the chambers 46, 48, and/or information gathered via the CAN system, to determine the mode of operation of the actuator 64, e.g., the first mode, the second mode, and the third mode, as well as determine whether the plug 72 should be dynamically/actively moved.

Instructions may be stored in a memory 122 of the controller 120 and automatically executed via a processor 124 of the controller 120 to provide the respective control functionality. Said differently, the controller 120 is configured to execute the instructions from the memory 122, via the processor 124. For example, the controller 120 may be a host machine or distributed system, e.g., a computer such as a digital computer or microcomputer, and, as the memory 122, tangible, non-transitory computer-readable memory such as read-only memory (ROM) or flash memory. The controller 120 may also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 120 may include all software, hardware, memory 122, algorithms, connections, sensors, etc., necessary to control and monitor the actuator 64, control and monitor the pressure differential between the chambers 46, 48, and receive and monitor information from the sensors 32 at the wheels 28. As such, a control method operative to control/monitor the actuator 64 and receive/monitor information from the sensors 32 at the wheels 28 and the pressure differential between the chambers 46, 48 may be embodied as software or firmware associated with the controller 120. It is to be appreciated that the controller 120 may also include any device capable of analyzing data from various sensors, comparing data, making the necessary decisions required to control/monitor the actuator 64, control/monitor the pressure differential, and receive/monitor the sensors 32 at the wheels 28. Optionally, more than one controller 120 may be utilized.

For illustrative purposes, each of the modes of operations of the actuator 64, and the positions of the plug 72 and the casing 70, are discussed below for the hydraulic mount assembly 12. Again, the controller 120 determines when to switch between the modes based on, for example, information from the sensors 32 at the wheels 28 or any other desired information.

Referring to FIG. 3, when the actuator 64 is actuated to operate in the first mode or idle mode, there is no appreciable hydraulic action causing the fluid to move between the first and second chambers 46, 48 (via the inertia track 58) because there are minimal vibrational forces between the dynamic mass 21 and the structure 36 or between the road 34 and the dynamic mass 21.

The magnetic apparatus 76 is energized to move the plug 72 to the first position which correspondingly moves the flange 66 of the casing 70 toward the second plate 52 and moves the first protrusion 106 of the casing 70 between the first detent 102 and the decoupler 56. The plug 72 initially moves to the first position to apply a force to the casing 70 to move the casing 70 to the initial position. Specifically, when the plug 72 is in the first position, movement of the plug 72 forces the casing 70 toward the second chamber 48 such that a distal end 126 of the plug 72 is disposed adjacent to the second end 86 (86 numbered, for example, in FIG. 2) of the casing 70. Hence, the plug 72 pushes the casing 70 toward the second plate 52. In this mode, the casing 70 is mechanically locked to the first plate 44 in the initial position via the first detent 102, and remains mechanically locked when the magnetic apparatus 76 is de-energized. In other words, the first protrusion 106 of the casing 70 is sandwiched between part of the first plate 44 and the first detent 102 of the first plate 44.

The decoupler 56 is disposed in the unlocked position to allow the degree of free movement of the decoupler 56 between the first and second plates 44, 52 when the actuator 64 is in the first mode, which corresponds to the plug 72 being in the first position to move the casing 70 to the initial position. The decoupler 56 may flutter between the first and second plates 44, 52 when in the unlocked position due to the low vibrations produced by the prime mover 22 during operation at idle. Also, when the actuator 64 is in the first mode, the second detent 118 of the plug 72 is disposed between the decoupler 56 and the second protrusion 116 such that the plug 72 is mechanically unlocked from the casing 70 when in the first position. Therefore, when the magnetic apparatus 76 is de-energized in the first mode, the plug 72 is allowed to bias to the central position in response to the first and second biasing members 94, 96 since the plug 72 is not mechanically locked to the casing 70.

The plug 72 may be actively movable relative to the casing 70 via the magnetic apparatus 76 when the plug 72 is unlocked from the casing 70 in the first mode. If the plug 72 is to be actively moved in the first mode, then the decoupler 56 is moved to the locked position. Furthermore, in this mode, while the casing 70 is locked to the first plate 44 and the decoupler 56 is locked, the magnetic apparatus 76 may then be activated to control the amount of the current to the coils 90 to actively move the plug 72 relative to the casing 70 in order to reduce vibrations at the periodic frequency of the prime mover 22. The plug 72 responds to the active control, and the movement of the plug 72 causes displacement of the fluid through the slot 114 which changes the pressure accordingly in the first and second chambers 46, 48. For the first mode, the controller 120 may communicate with a crankshaft position sensor to track the periodic movement of the prime mover 22, and the controller 120 determines how much the plug 72 should fluctuate. Additionally, the controller 120 may use information regarding the pressure differential between the first and second chambers 46, 48 and the magnetic force from energizing the magnetic apparatus 76 to control active movement of the plug 72 while the actuator 64 is in the first mode.

Referring to FIG. 4, when the actuator 64 is actuated to operate in the second mode or rough road mode, there is hydraulic action causing the fluid to move between the first and second chambers 46, 48 (via the inertia track 58) because there is relative movement between the dynamic mass 21 and/or the prime mover 22 and the structure 36. There is generally a large displacement of the fluid from the second chamber 48 to the first chamber 46 in this mode. The magnetic apparatus 76 is energized to move the plug 72 to the second position which correspondingly moves the flange 66 of the casing 70 toward the first plate 44 such that the casing 70 is in the secondary position. The second detent 118 of the plug 72 engages the casing 70 to move the casing 70 in the opposite direction from the initial position in the idle mode.

When the actuator 64 is in the second mode, the casing 70 is in the secondary position which disposes the first protrusion 106 of the casing 70 farther away from the decoupler 56 as compared to when the plug 72 is in the first position. When the casing 70 is in the secondary position, the first detent 102 of the first plate 44 is disposed between the first protrusion 106 of the casing 70 and the decoupler 56. The first protrusion 106 of the casing 70 is movable over the first detent 102 of the first plate 44 away from the decoupler 56 when the casing 70 is in the secondary position. Therefore, the casing 70 is now mechanically locked to the first plate 44 in the secondary position (as compared to the initial position), and remains mechanically locked when the magnetic apparatus 76 is de-energized.

The flange 66 of the casing 70 pinches the decoupler 56 to the first plate 44 when the casing 70 is in the secondary position. Therefore, the decoupler 56 is disposed in the locked position to sandwich the decoupler 56 to the first plate 44 when the actuator 64 is in the second mode, which corresponds to the plug 72 being in the second position to move the casing 70 to the secondary position. The decoupler 56 prevents fluid communication between the first and second passages 50, 54 to the first and second chambers 46, 48, which then causes hydraulic action via the inertia track 58 between the first and second chambers 46, 48 for any relative movement between the mount body 38 and the powertrain 10.

When comparing the first position of the plug 72 to the second position, the plug 72 moves farther away from the decoupler 56 when in the second position. The second detent 118 of the plug 72 is movable over the second protrusion 116 of the casing 70 away from the decoupler 56 when the casing 70 is in the secondary position. Generally, the plug 72 is mechanically locked to the casing 70 when in the second position via the second detent 118, and remains mechanically locked when the magnetic apparatus 76 is de-energized for the second position. In other words, the second detent 118 of the plug 72 is sandwiched between the second protrusion 116 and one of the stops 100 of the casing 70. When the magnetic apparatus 76 is de-energized in the second mode, the plug 72 remains in the second position due to the position of the second detent 118 relative to the second protrusion 116, and thus, the plug 72 is not allowed to return to the central position and is not allowed to be actively controlled in the second mode.

Referring to FIG. 5, when the actuator 64 is actuated to operate in the third mode or SRS mode, there is hydraulic action causing the fluid to move between the first and second chambers 46, 48 (via the inertia track 58) due to the relative movement between the dynamic mass 21 and/or the prime mover 22 and the structure 36 or between the road 34 and the dynamic mass 21. The magnetic apparatus 76 is energized to move the plug 72 to the third position which correspondingly moves the flange 66 of the casing 70 toward the first plate 44 such that the casing 70 is in the secondary position.

When the actuator 64 is in the third mode, the casing 70 is in the secondary position which disposes the first protrusion 106 of the casing 70 farther away from the decoupler 56 as compared to when the plug 72 is in the first position. When the casing 70 is in the secondary position, the first detent 102 of the first plate 44 is disposed between the first protrusion 106 of the casing 70 and the decoupler 56. The first protrusion 106 of the casing 70 is movable over the first detent 102 of the first plate 44 away from the decoupler 56 when the casing 70 is in the secondary position. The second detent 118 of the plug 72 engages the casing 70 to move the casing 70 in the opposite direction from the idle mode. Therefore, the casing 70 is now mechanically locked to the first plate 44 in the secondary position (as compared to the initial position), and remains mechanically locked when the magnetic apparatus 76 is de-energized, and in certain situations, remains mechanically locked when the magnetic apparatus 76 is energized. Once the casing 70 is mechanically locked in the secondary position, the second detent 118 of the plug 72 moves back over the second protrusion 116 of the casing 70 such that the plug 72 may return to the central position.

The flange 66 of the casing 70 pinches the decoupler 56 to the first plate 44 when the casing 70 is in the secondary position. The decoupler 56 is disposed in the locked position to sandwich the decoupler 56 to the first plate 44 when the actuator 64 is in the third mode, which corresponds to the casing 70 being in the secondary position and the plug 72 being in the third position. The decoupler 56 prevents fluid communication between the first and second passages 50, 54 to the first and second chambers 46, 48, which then causes hydraulic action via the inertia track 58 between the first and second chambers 46, 48 for any relative movement between the mount body 38 and the powertrain 10.

When comparing the first position of the plug 72 to the third position, the plug 72 moves away from the decoupler 56 when in the third position. When the actuator 64 is in the third mode, the second detent 118 of the plug 72 is disposed between the decoupler 56 and the second protrusion 116 such that the plug 72 is mechanically unlocked from the casing 70 when in the third position. Specifically, when the plug 72 is in the third position, the distal end 126 of the plug 72 is disposed farther from the second end 86 of the casing 70 as compared to when the plug 72 is in the first position. Therefore, when the magnetic apparatus 76 is de-energized, or energized in certain situations, in the third mode, the plug 72 is allowed to bias to the central position in response to the first and second biasing members 94, 96 since the plug 72 is not mechanically locked to the casing 70.

The plug 72 may be actively movable relative to the casing 70 via the magnetic apparatus 76 when the plug 72 is unlocked from the casing 70 in the third mode. The plug 72 is actively movable via the magnetic apparatus 76 when the actuator 64 is in the third mode while the decoupler 56 remains in the locked position. The plug 72 is also movable in response to the pressure differentials between the first and second chambers 46, 48 when the actuator 64 is in the third mode while the decoupler 56 remains in the locked position. Furthermore, in this mode, while the casing 70 is locked to the first plate 44, the magnetic apparatus 76 may then be activated to control the amount of the current to the coils 90 to actively move the plug 72 relative to the casing 70 in order to target vibration(s) at the periodic frequency produced due to rotation of the wheels 28. The plug 72 responds to the combined forces of the active control from the actuator 64 and the pressure differentials between the first and second chambers 46, 48. Specifically, the controller 120 is in communication with the magnetic apparatus 76, and the controller 120 may use information regarding the pressure differential between the first and second chambers 46, 48 and the magnetic force from energizing the magnetic apparatus 76 to control active movement of the plug 72 while the actuator 64 is in the third mode. The magnetic force is determined by the amount of the current through the coils 90 of the magnetic apparatus 76. The motion of the plug 72 produces a dynamic voltage across the coils 90. The motion of the plug 72 is responsive to the pressure differential between the first and second chambers 46, 48 and the magnetic force from energizing the magnetic apparatus 76. The dynamic voltage is continuously measured via the controller 120, and the current applied to the coils 90 is controlled via the controller 120. The controller 120 may use calculations to determine the pressure differential ΔP (of FIG. 8) between the first and second chambers 46, 48 by using the amount of active movement of the plug 72, the magnetic force from energizing the magnetic apparatus 76, the properties of the coils 90 (which may include the number of windings), the strength of the magnetic field of the magnetic apparatus 76, and the physical properties of the plug 72 and support features. The physical properties of the plug 72 and the support features may include the mass of the plug 72, the area of the plug 72 at the plug's fluid interface, the axial restoring stiffness of the first and second biasing members 94, 96, and damping of the first and second biasing members 94, 96 at the restoring stiffness. The active movement of the plug 72 is derived from the voltage of the actuator 64 and the current applied to the coils 90 by using an electrical impedance of the actuator 64, which may be determined by equations (1) and (2) immediately below.

$$V_{out}(s)=I_p(s)*Z_C(s)+K_c*V_p(s) \tag{1}$$

wherein:
$V_{out}$=voltage across the coils 90;
s=Laplace variables, wherein s=j*ω, with j=$\sqrt{-1}$;
j=imaginary number;
ω=circular or angular frequency in radians/seconds (e.g., 2*π*f, where f=the frequency in Hertz);
$I_p$=a phasor of the desired current delivered to the coils 90 to drive the plug 72;
$Z_C$=impedance of the coils 90, which includes a real component (e.g., resistance part) and an imaginary component (e.g., inductance and capacitance parts);
$K_c$=proportionality factor which relates to the design of the coils 90 and the strength of the magnetic field yielding a sensitivity coefficient in volts/(meters/seconds); and
$V_p$=velocity of the plug 72.

$$V_p(s)=(V_{out}(s)-I_p(s)*Z_C(s))/K_C \tag{2}$$

wherein:
$V_p$=defined above under equation (1);
s=defined above under equation (1);
$V_{out}$=defined above under equation (1);
$I_p$=defined above under equation (1);
$Z_C$=defined above under equation (1); and
$K_c$=defined above under equation (1).

Therefore, the actuator 64, such as the voice coil actuator, and the controller 120 cooperate to perform a dual role of causing actuation of the plug 72 and measuring the active motion of the plug 72. The voice coil actuator may include the plug 72 and the magnetic apparatus 76, and the controller 120 is in communication with the voice coil actuator to monitor, calculate, and/or extract information to provide both actuation of the plug 72 and sensing via measuring the velocity of the plug 72 (in other words, measuring the motion of the plug 72 as discussed above). This dual role of the actuator 64 and the controller 120 eliminates the need for an additional, separate sensor, such as motion and pressure sensors, that are common for other actively controlled mount systems. As such, the actuator 64 provides the advantage of reliability and reduction of cost through reduction of parts.

The controller 120 and the voice coil actuator may use all of the information, data, etc., discussed above to provide the dual role. The voice coil actuator may provide proportional or tight-servo control. In other words, the voice coil actuator excels at providing precision control. The voice coil actuator may be a DC linear actuator or a direct-drive linear motor. Therefore, generally, the actuator 64 may cause linear movement of the plug 72 along the longitudinal axis 74.

The methods, assemblies, systems, apparatuses discussed herein may be used to reduce the effects of periodic vibration(s) felt in the passenger compartment 18. Generally, the periodic vibrations that are being referred to are the vibrations that may occur due to SRS, and/or other undesirable conditions. When the corners 30 of the vehicle 14 are rotated, this results in excitations at the corners 30 that may cause vibrations at, for example, the powertrain 10 of the vehicle 14 which may ultimately be felt in the passenger compartment 18. Excitations at the corners 30 of the vehicle 14 are defined (in part) by the periodic rotation of the wheel 28. If the controller 120 knows the frequency of the wheel 28 and the instantaneous angular position of the wheel 28, the controller 120 has the information required to determine the periodic content of anything in the subsystem. Based on the position of the corners 30, the corrections to the hydraulic mount assembly 12 that are required to counteract the excitation may be determined. If the frequency of the wheel 28 and the instantaneous angular position of the wheel 28, are known, by observing the excitation coming from the corner(s) 30, the excitation may be counteracted by injecting a periodic signal from the hydraulic mount assembly 12 to identically counteract the excitation coming from the corner(s) 30, thus minimizing the excitation coming from the corner(s) 30 to reduce the effects of periodic vibrations felt in the passenger compartment 18. The method discussed below may be used to attenuate vibration(s) having a first order frequency, as well as higher- or multi-order components centered at frequencies that are integer multiples of the first order frequency; and in addition, may be tuned to attenuate vibration(s) having a second order frequency, a third order frequency, etc.

Therefore, the controller 120 may generate appropriate motor control signals that, when applied to the hydraulic mount assembly 12, will counter-act vibrations relative to the passenger compartment 18 arising from the corners 30, and minimize the periodic vibrations generated by one or more wheels 28 or one or more corners 30 of the vehicle 14. It is desirable to provide additional controls to the third mode, or the SRS mode, to actively reduce vibrations when in this mode. Therefore, the below discussion focuses on the third mode/the SRS mode, and thus, focuses on the method of controlling the third mode/the SRS mode.

Excitation at one or more corners 30 of the vehicle 14 during movement of the vehicle 14 may cause periodic vibrations, which may arise from a variety of sources, and non-limiting examples may include road conditions, non-uniformities of the tire and/or the wheel 28, any imbalance in any of the rotating parts of the corner(s) 30. As discussed above, generally one of the sensors 32 is coupled to each one of the wheels 28. The sensors 32 may be used to determine the speed of the wheel 28 and/or the relative angular position of the wheel 28. The sensors 32 of the wheels 28 are in communication with the controller 120, and thus, information may be compiled regarding the speed of the wheel 28 and the relative angular position of the wheel 28. The controller 120 may use the information to determine the absolute angular position of the wheel 28, and may then translate the angular position of the wheel 28 to angular velocity of the wheel 28 via differentiation. The information may then be used to determine the frequency, and the integer multiples of the frequency, needed to minimize the periodic vibrations generated by one or more wheels 28 or corners 30.

Figure 6:
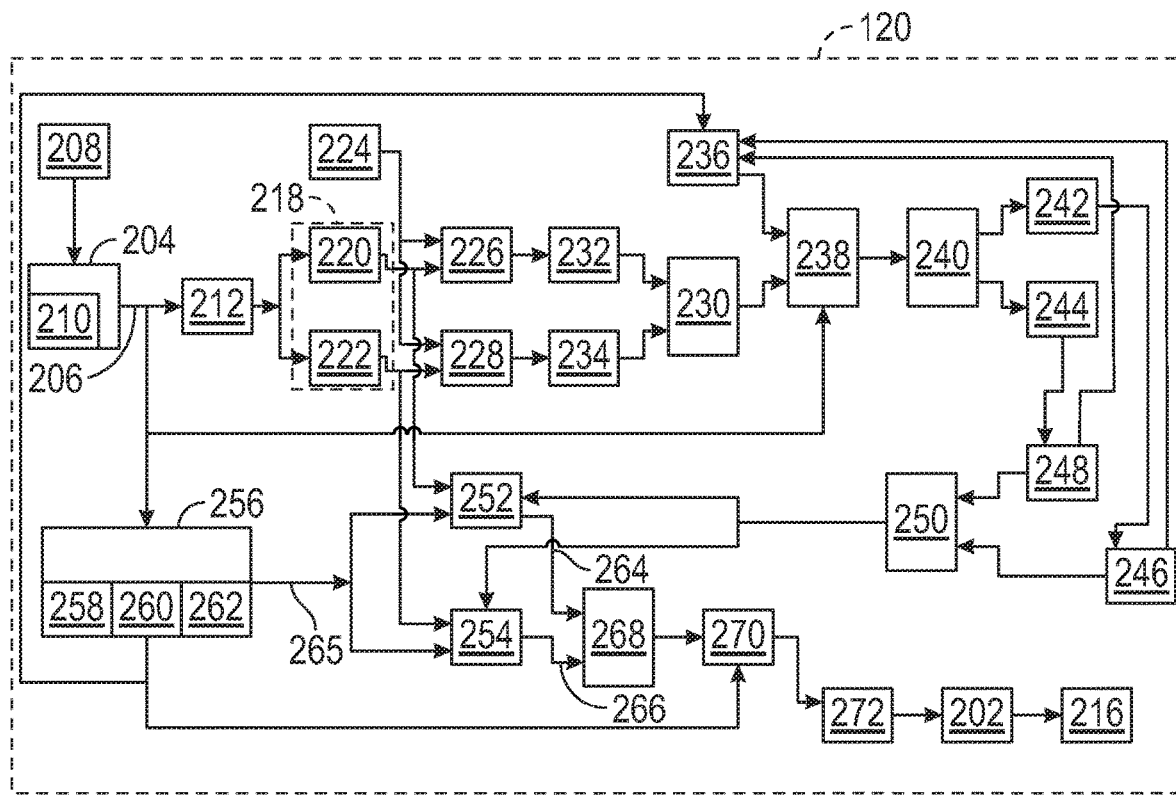
FIG. 6 is a schematic flowchart of one example to implement the controls of the third mode.
Figure 7:
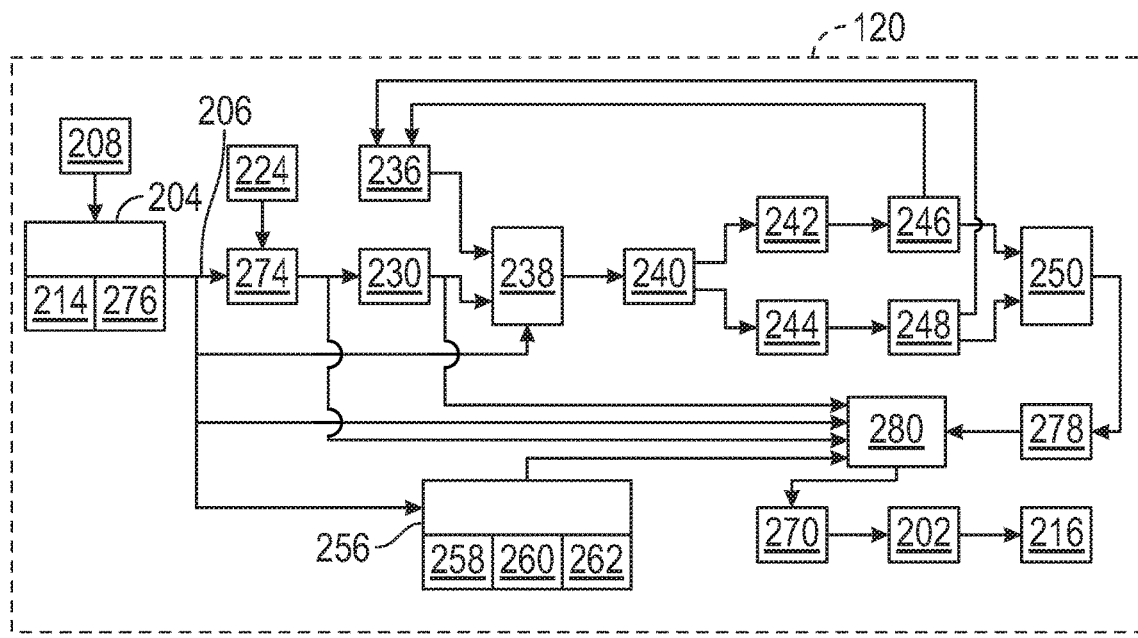
FIG. 7 is a schematic flowchart of another example to implement the controls of the third mode.

The present disclosure provides methods of attenuating vibration transfer to the body 16 of the vehicle 14 using the dynamic mass 21 of the vehicle 14. Therefore, vibration transfer to the passenger compartment 18 may be suppressed or attenuated by using the methods herein. Specifically, the controller 120 implements control logic that is illustrated in FIGS. 6 and 7 to generate a gain-and-phase-compensated actuator drive command 202 that controls the actuator 64 of the hydraulic mount assembly 12 to minimize the periodic vibrations generated by one or more of the wheels 28 or the corners 30 when in the SRS mode. When in the SRS mode, vibrations from the dynamic mass 21 act on the hydraulic mount assembly 12, as well as vibrations from the wheels 28/the corners 30 through the body 16 act on the hydraulic mount assembly 12 (see FIG. 8), and the methods discussed herein may suppress or attenuate vibration transfer to the passenger compartment 18. It is to be appreciated that commonalities between FIGS. 6 and 7 utilize the same reference numbers.

As discussed above, when the actuator 64 is in the SRS mode or the third mode, the decoupler 56 is in the locked position (see FIG. 5) because there are forces occurring between the dynamic mass 21 and/or the prime mover 22 and the structure 36, by which vibrations of the body 16 and the passenger compartment 18 may be suppressed. Furthermore, when the actuator 64 is in the third mode, the casing 70 is in the secondary position (FIG. 5), and the plug 72 may be actively movable relative to the casing 70 via the magnetic apparatus 76 when the plug 72 is unlocked from the casing 70 in this mode.

Referring to FIGS. 6 and 7, the methods include receiving vehicle information 204 over a time interval. The controller 120 receives the vehicle information 204. An instantaneous angular velocity 206 that corresponds to a particular angular frequency of at least one wheel 28 is determined based on the vehicle information 204. When referring to the particular angular frequency of the wheel(s) 28, this may include one or more integer multiple(s) of this frequency. The instantaneous angular velocity 206 is an estimate determined via the controller 120. Specifically, the controller 120 extracts vehicle information from various components of the vehicle's system, and for example, from an in-vehicle local area network (LAN) 208 and/or the sensors 32 of the wheels 28, to estimate the instantaneous angular velocity 206. For the configuration of FIG. 6, the extracted vehicle information from the vehicle's LAN 208 may include wheel speed information from an anti-lock brake system (ABS) pulse trains of an electronic brake control system unit, which may be coupled to a brake for the wheels 28 and/or in communication with the sensors 32. Therefore, for FIG. 6, the controller 120 extracts information from the ABS pulse trains provided over the vehicle's LAN 208 and/or the sensors 32 to generate estimates of the instantaneous angular velocity 206, which are used to generate carrier signals that are then processed to extract periodic motion fluctuations of the plug 72. For the configuration of FIG. 7, the extracted information from the vehicle's LAN 208 may include the sensors 32 of the wheels 28 and/or a speed of the prime mover 22 or the vehicle 14.

In certain configurations, such as FIG. 6, receiving the vehicle information 204 further includes receiving angular position information 210 that includes changes in an angular position of the wheel 28 over the time interval. Therefore, in this configuration, determining, based on the vehicle information 204, further includes determining, based on the angular position information 210, the instantaneous angular velocity 206 that corresponds to the particular angular frequency of the wheel 28 based on the angular position of the wheel 28. The instantaneous angular velocity 206 is then integrated by an integrator 212 to output an estimated angular position of the wheel 28.

In other configurations, such as FIG. 7, receiving the vehicle information 204 further includes receiving a speed $V_{vs}$ of the vehicle 14, at box 214. Therefore, in this configuration, determining based on the vehicle information 204 further includes determining, based on the speed 214 of the vehicle 14, the instantaneous angular velocity 206 that corresponds to the particular angular frequency of the wheel 28. Information to determine the speed of the vehicle 14 may include the sensors 32 of the wheels 28 and/or the speed of the prime mover 22 or the vehicle 14.

Referring to FIGS. 6 and 7, the method further includes generating the gain-and-phase-compensated actuator drive command 202 to counteract the vibration that occurs at the particular angular frequency of the wheel 28, which is based on the instantaneous angular velocity 206. The gain-and-phase-compensated actuator drive command 202 may be determined by measuring/calculating the motion of the plug 72 and the particular angular frequency of the wheel 28. The motion of the plug 72 may be determined via equations (1) and (2) as discussed above. Therefore, generally, operation of the hydraulic mount assembly 12, in response to the gain-and-phase-compensated actuator drive command 202, may produce vibratory motion at a frequency or integer multiples of the frequency (that counteracts the vibration that occurs at the particular angular frequency of the wheel 28) to thereby attenuate vibration transfer to the body 16 of the vehicle 14. It is to be appreciated that the frequency produced via the hydraulic mount assembly 12 (which is induced by the periodic motion of the plug 72) to counteract the vibration that occurs at the particular angular frequency of the wheel 28 may be a first order frequency, a second order frequency, a third order frequency, etc.; or stated differently, higher- or multi-order components centered at frequencies that are integer multiples of the first order frequency.

The gain-and-phase-compensated actuator drive command 202 is communicated to the hydraulic mount assembly 12 that supports the dynamic mass 21. As such, the gain-and-phase-compensated actuator drive command 202 causes the actuator 64 to apply a periodic magnetic force to dynamically change the position of the plug 72 to dynamically reduce periodic content at the particular angular frequency thereby attenuating the vibration transfer to the body 16 of the vehicle 14 using the dynamic mass 21 of the vehicle 14. The periodic magnetic force produced via the actuator 64 causes a superimposed periodic dynamic movement of the plug 72, which results in periodic displacement of the hydraulic fluid between the first and second chambers 46, 48 via the inertia track 58 to create the hydraulic action of the hydraulic mount assembly 12. This hydraulic action of the hydraulic mount assembly 12 produces a pressure difference $\Delta P$ (of FIG. 8) between the first and second chambers 46, 48 which acts over the effective termination area of the hydraulic mount assembly 12. The action of the hydraulic mount assembly 12 results in a periodic dynamic force exerted between the body 16 of the vehicle 14 and the dynamic mass 21 of the vehicle 14. The magnitude and phase of the periodic dynamic force is produced and manipulated to offset the periodic forces, such as vibrations at the particular angular frequency of the corners 30, which thereby attenuate vibrations transferred from the corners 30 to the passenger compartment 18.

Again, continuing with FIGS. 6 and 7, the method includes actuating the actuator 64, at box 216, of the hydraulic mount assembly 12 in response to the gain-and-phase-compensated actuator drive command 202 in order to minimize the vibration transfer to the body 16 due to the vibration that occurs at the particular angular frequency of the wheel 28. In certain configurations, actuating the actuator 64 of the hydraulic mount assembly 12 may include energizing the magnetic apparatus 76 of the actuator 64 which moves the plug 72 and locks the decoupler 56 to the first plate 44 to cause hydraulic action between the first chamber 46 and the second chamber 48. In order to lock the decoupler 56, energizing the magnetic apparatus 76 may further include energizing the magnetic apparatus 76 which moves the plug 72 to a displaced position (referred to as the third position above) to correspondingly lock the casing 70 to the first plate 44 in the secondary position. Locking the casing 70 in the secondary position locks the decoupler 56 to the first plate 44 such that the decoupler 56 abuts the first plate 44 which causes the hydraulic action to occur through the first and second chambers 46, 48 via the inertia track 58. Said differently, actuating the actuator 64 of the hydraulic mount assembly 12 may further include energizing the magnetic apparatus 76 of the actuator 64 which moves the plug 72 and locks the decoupler 56 against the first plate 44 to cause hydraulic action between the first chamber 46 and the second chamber 48 via the inertia track 58.

For the SRS mode, after the plug 72 is in the displaced position, it is desirable to return the plug 72 to a centralized location in order to operate the plug 72 to reduce the periodic vibrations while the casing 70 remains in the secondary position. Therefore, the method may include positioning the plug 72 in the central position after locking the casing 70 in the secondary position. Generally, the central position is different from the displaced position.

Once the plug 72 returns to the central position, the magnetic apparatus 76 may be energized to cause movement of the plug 72 relative to the casing 70 in a pattern to minimize the vibration transfer to the passenger compartment 18 due to the vibration that occurs at the particular angular frequency produced via the wheels 28. In other words, superimposed movement of the plug 72 in the pattern may dynamically reduce periodic content at the targeted angular frequency, or multiple frequencies, of the wheel 28. Therefore, energizing the magnetic apparatus 76 may further include energizing the magnetic apparatus 76 to change the amount of current through the coils 90 that magnetically interact with the magnets 88 to cause fluctuation of the plug 72 from the central position while the casing 70 remains in the secondary position in order to minimize the vibration transfer to the body 16 (and felt in the passenger compartment 18) due to the vibration that occurs at the particular angular frequency of the wheel 28. The magnetic strength may be increased, decreased, etc., depending on the desired movement of the plug 72 relative to the casing 70. The magnetic strength is determined by the gain-and-phase-compensated actuator drive command 202.

Referring to FIG. 6, generating the gain-and-phase-compensated actuator drive command 202 may further include generating the gain-and-phase-compensated actuator drive command 202 to counteract the vibration that occurs at the particular angular frequency of the wheel 28, which is based on the instantaneous angular velocity and the angular position of the wheel 28. Generating the gain-and-phase-compensated actuator drive command 202 may include: A) generating, based on the angular position of the wheel 28, a sinusoidal carrier 218 at a frequency that corresponds to the instantaneous angular velocity 206, and the sinusoidal carrier 218 includes at least two sinusoids 220, 222 that have a phase difference, and B) individually mixing the at least two sinusoids 220, 222 of the sinusoidal carrier 218 with a velocity $V_p$ of the plug 72 (box 224) to generate mixed signals 226, 228. The generation of the sinusoidal carrier 218 may include integer multiples of the particular angular frequency of the wheel 28.

In certain configurations, continuing with FIG. 6, the sinusoidal carrier 218 may further include a sine-function carrier signal 220 and a cosine-function carrier signal 222 that is 90 degrees out-of-phase with respect to the sine-function carrier signal 220. Furthermore, individually mixing the at least two sinusoids 220, 222 of the sinusoidal carrier with the velocity of the plug 72 (box 224) to generate the mixed signals 226, 228 may further include generating a mixed sine signal 226 from the velocity of the plug 72 and the sine-function carrier signal 220, and generating a mixed cosine signal 228 from the velocity of the plug 72 (box 224) and the cosine-function carrier signal 222.

Next, the method of FIG. 6 may include determining a phasor 230 based on an average 232 of the mixed sine signal 226 over the time interval and based on an average 234 of the mixed cosine signal 228 over the time interval. The phasor 230 takes out high frequency noise. By averaging the signals 232, 234, the periodic vibrations attributable to the wheel 28 is converged, which through subsequent actions, provides the removal of periodic vibrations at the desired periodic frequency. Therefore, the phasor 230 provides an accurate representation of the targeted periodic vibrations to be countered.

The phasor 230 and a phasor of an amount of current $I_p$ that drives the plug 72, at box 236, are inputted into various mathematical equations at box 238 to determine an amount of displacement $Y_{body}$ (see FIG. 8) of the body 16, at box 240, of the vehicle 14. The phasor of the amount of current $I_p$ that drives the plug 72, at box 236, is formed from the quotient of a numerator divided by an estimated transfer function, box 256, described in detail below. The numerator of this quotient is a phasor combination with a real component and an imaginary component of an accumulated real component of the vertical displacement $Y_{body}$ and an accumulated imaginary component of the vertical displacement $Y_{body}$ of the body 16. The estimate of the instantaneous angular velocity 206 may also be directly outputted to the mathematical equations at box 238. Also, the output of box 256 may be directly outputted to box 236. The phasor 230 and the phasor of the amount of current that drives the plug 72, at box 236, are used to determine the amount of displacement of the body 16, at box 240, of the vehicle 14. The body 16 being referred to with regard to this displacement is the participating mass, not the total mass, and thus, the body 16 does not include the dynamic mass 21 (the dynamic mass 21, in certain configurations, includes the powertrain 10, and thus, the body 16 does not include the powertrain 10) and suspension at the corners 30 of the vehicle 14. Therefore, when referring to the body 16, the body 16 includes all of the other mass (except for the mass of the components discussed immediately above (e.g., dynamic mass 21, suspension)), which may include the passenger compartment 18 and the structure 36.

It is to be appreciated that all of the mathematical equations (1) through (15) are presented in Laplace form. The mathematical equations at box 238 may include the following equations, and also see FIG. 8:

$$P_1 = H_{1p} \cdot I_p + H_{1s} \cdot Y_s \tag{3}$$

wherein:

$P_1$=pressure in the first chamber 46 (effective pressure determining force generation of the hydraulic mount assembly 12);
$H_{1p}$=transfer function of $I_p$ to $P_1$;
$I_p$=defined above under equation (1);
$H_{1s}$=transfer function of stroke, $Y_s$ to $P_1$; and
$Y_s$=stroke of the hydraulic mount assembly 12 (also see FIG. 8).

$$P_2 = H_{2p} \cdot I_p + H_{2s} \cdot Y_s \tag{4}$$

wherein:

$P_2$=pressure in the second chamber 48 (effective pressure determining force generation of the hydraulic mount assembly 12);
$H_{2p}$=transfer function of $I_p$ to $P_2$;
$I_p$=defined above under equation (1-3);
$H_{2s}$=transfer function of stroke, $Y_S$ to $P_2$; and
$Y_s$=defined above under equation (3).

$$Y_s = Y_{PT} - Y_{body} \tag{5}$$

wherein:

$Y_s$=defined above under equation (3);
$Y_{PT}$=vertical displacement of the dynamic mass 21, such as the powertrain 10 in various examples (also see FIG. 8); and
$Y_{body}$=vertical displacement of the body 16 (also see FIG. 8).

$$F_{mnt} = K \cdot Y_s + (H_{2P} - H_{1P}) I_p \cdot A_{plate} \tag{6}$$

wherein:

$F_{mnt}$=force developed in the hydraulic mount assembly 12 acting between the dynamic mass 21 and the body 16;
K=complex stiffness of the hydraulic mount assembly 12 with $I_p$=0 (includes volume dilation effects of the actuator 64 suspension via the first and second biasing members 94, 96;
$Y_s$=defined above under equation (3);
$H_{1p}$=defined above under equation (3);
$H_{2p}$=defined above under equation (4)
$I_p$=defined above under equation (3); and
$A_{plate}$=effective area of the first and second plates 44, 52 of the hydraulic mount assembly 12.

$$F_{mnt} + m_{PT} \cdot s^2 Y_{PT} = 0 \tag{7}$$

wherein:

$F_{mnt}$=defined above under equation (6);
$m_{PT}$=mass of the dynamic mass 21, such as the powertrain 10 in various examples (also see FIG. 8);
s=defined above under equation (1)
$Y_{PT}$=defined above under equation (5).

$$F_{mnt} - (m_{Body} \cdot s^2 + c_{Body} s + k_{Body}) Y_{Body} + F_{exe-corner} = 0 \tag{8}$$

wherein:

$F_{mnt}$=defined above under equation (6);
$m_{Body}$=mass of the body 16 (also see FIG. 8);
$c_{Body}$=equivalent damping coefficient of a damper between the mass of the body 16 and the road 34, with the damper including a combination of top mounts, vertical suspension dampers and tires of the wheels 28;
$k_{Body}$=equivalent spring rate for a spring between the mass of the body 16 and the road 34, with the spring including a combination of suspension springs and tires of the wheels 28;
s=defined above under equation (1);
$Y_{Body}$=defined above under equation (5); and
$F_{exe-corner}$=excitation force from the corner 30 (includes multiplicative force transmissibility from a spindle center of the wheels 28) (also see FIG. 8).

$$Ao \cdot (P_2 - P_1) = (m_p s^2 + c_p s + k_p) X_p + F_p \tag{9}$$

wherein:
Ao=area of the plug 72;
$P_1$=defined above under equation (3);
$P_2$=defined above under equation (4);
$m_p$=mass of the plug 72;
s=defined above under equation (1);
$c_p$=damping of the first and second biasing members 94, 96 supporting the plug 72;
$k_p$=stiffness of the first and second biasing members 94, 96 supporting the plug 72;
$X_p$=displacement of the plug 72 (displacement of the plug 72 produces a volume displacement of the fluid in the first and second chambers 46, 48); and
$F_p$=magnetic force on the coils 90 produced by $I_p$.

$$sX_p = V_p \tag{10}$$

wherein:
s=defined above under equation (1);
$X_p$=defined above under equation (9); and
$V_p$=defined above under equation (1) (calculated from equation (2)).

$$F_p = K_p * I_p \tag{11}$$

wherein:
$F_p$=defined above under equation (9);
$K_p$=constant that determines $F_p$ given $I_p$; and
$I_p$=defined above under equation (1).

Next, the amount of displacement of the body 16 (at box 240) is used to generate processed signals 242, 244 for a real component 242 of the body displacement 240 and an imaginary component 244 of the body displacement 240 that is 90 degrees out-of-phase from the real component 242. The real component 242 is the in-phase sinusoidal component relative to a reference waveform or time definition, and the imaginary component 244 is the out-of-phase sinusoidal component relative to the reference waveform or time definition.

The processed signals 242, 244 are compiled to generate extracted signals 246, 248. In certain configurations, compiling the processed signals 242, 244 to generate the extracted signals 246, 248 may further include compiling the processed signals 242, 244 to generate a first extracted signal and a second extracted signal. The first extracted signal may be the compilation or summation of equation (12):

$$Re(\text{Int}, t) = Re(\text{Int}, t-\Delta_t) + \alpha \cdot Re(Y_{Body}) \tag{12}$$

wherein:
Re(Int, t)=magnitude of an accumulated real component of the vertical displacement of the body 16 at a present time;
$\Delta_t$=a sampling of time;
Re(Int, t−$\Delta_t$)=magnitude of an accumulated real component of the vertical displacement of the body 16 at a previous time while applying the sampling interval of time $\Delta_t$;
α=accumulation scalar coefficient; and
Re($Y_{Body}$)=magnitude of the real component of the vertical displacement of the body 16.

The second extracted signal may be the compilation or summation of equation (13):

$$Im(\text{Int}, t) = Im(\text{Int}, t-\Delta_t) + \alpha \cdot Im(Y_{Body}) \tag{13}$$

wherein:
Im(Int, t)=magnitude of an accumulated imaginary component of the vertical displacement of the body 16 at a present time;
$\Delta_t$=defined above under equation (12);
Im(Int, t−$\Delta_t$)=magnitude of an accumulated imaginary component of the vertical displacement of the body 16 at a previous time while applying the sampling interval of time $\Delta_t$;
α=defined above under equation (12); and
Im($Y_{Body}$)=magnitude of the imaginary component of the vertical displacement of the body 16.

Then, the first and second extracted signals may be sent to a multiplexer 250 to generate a multiplexed signal that is outputted to a first mixer 252 and a second mixer 254. The multiplexed signal from the multiplexer 250 provides the magnitudes of the accumulated real component and the accumulated imaginary components of the vertical displacement of the body 16. Specifically, the first mixer 252 receives the sine-function carrier signal 220 (from the sinusoidal carrier 218), the carrier phase angle adjustment value (at the selected frequency from the estimated transfer function 256) and the multiplexed signal (from the multiplexer 250). The first mixer 252 modifies the sine-function carrier signal 220 based on the carrier phase angle adjustment value and lead compensation information 260 from the estimated transfer function 256 to generate a first phase-adjusted-amplitude-modulated carrier signal 264. The first mixer 252 amplitude modulates the first phase-adjusted-amplitude-modulated carrier signal 264 based on amplitudes of the extracted signals to generate a sine carrier of the first phase-adjusted-amplitude-modulated carrier signal 264 that will eventually interfere with a disturbance signal that is caused due to excitations at the corners 30. As one non-limiting example, the first mixer 252 may transform the signals inputted thereto by equation (14):

$$(\cos(u[4])*u[2] - \sin(u[4])*u[3])*u[1] \tag{14}$$

wherein:
u[1]=the sine-function carrier signal 220;
u[2]=the second extracted signal;
u[3]=the first extracted signal; and
u[4]=a carrier phase angle adjustment value signal 265.

Similarly, the second mixer 254 receives the cosine-function carrier signal 222 (from the sinusoidal carrier 218), the carrier phase angle adjustment value (at the selected frequency from the estimated transfer function 256) and the multiplexed signal (from the multiplexer 250). The second mixer 254 modifies the cosine-function carrier signal 222 based on the carrier phase angle adjustment value and the lead compensation information 260 from the estimated transfer function 256 to generate a second phase-adjusted-amplitude-modulated carrier signal 266. The second mixer 254 amplitude modulates second phase-adjusted-amplitude-modulated carrier signal 266 based on the amplitudes of the extracted signals to generate a cosine carrier of the second phase-adjusted-amplitude-modulated signal 266 that will interfere with a disturbance signal that is caused due to excitations at the corners 30. As one non-limiting example, the second mixer 254 may transform the signals inputted thereto by equation (15):

$$(\cos(u[4])*u[3] - \sin(u[4])*u[2])*u[5] \tag{15}$$

wherein:
u[2]=defined above under equation (14);
u[3]=defined above under equation (14);
u[4]=defined above under equation (14); and
u[5]=a cosine-function carrier signal outputted from the cosine-function carrier signal 222.

Continuing with FIG. 6, generating the gain-and-phase compensated actuator drive command 202 may further include determining the estimated transfer function 256 based on a dynamic relationship between the phasor of the amount of current $I_p$ that drives the plug 72 and a phasor of the displacement $Y_{body}$ of the body 16 of the vehicle 14. Furthermore, generating the gain-and-phase-compensated actuator drive command 202 may further include storing a look-up table 258 that includes a plurality of entries. Each of the entries may include a frequency, a value of the amount of current that drives the plug 72, the phasor of the displacement $Y_{body}$ of the body 16 of the vehicle 14 which is responsive to the amount of current that drives the plug 72, and a carrier phase angle adjustment value corresponding to the lead compensation information 260. The look-up table 258 may include an inverse transfer function that is a discretized representation of an inverse of the estimated transfer function 256 with the lead compensation information 260. The carrier phase angle adjustment value is the compilation, and more specifically the summation, of an angle of the inverse transfer function and the lead compensation information 260 which uses the instantaneous angular velocity 206. The gain adjustment value 262 is the magnitude of the inverse transfer function at the desired or targeted frequency created via the hydraulic mount assembly 12 to attenuate the vibration at the particular angular frequency of the wheel 28. When referring to the frequency created via the hydraulic mount assembly 12, this may include integer multiples of this frequency.

Again, continuing with FIG. 6, information from the estimated transfer function 256 is transferred to the mixers 252, 254. Specifically, the first mixer 252 receives the sine-function carrier signal 220 (from the sinusoidal carrier 218), the carrier phase angle adjustment value (at the selected frequency from the estimated transfer function 256) and the multiplexed signal (from the multiplexer 250). The first mixer 252 modifies the sine-function carrier signal 220 based on the carrier phase angle adjustment value and the lead compensation information 260 from the estimated transfer function 256 to generate the first phase-adjusted-amplitude-modulated carrier signal 264. The first mixer 252 amplitude modulates the first phase-adjusted-amplitude-modulated carrier signal 264 based on amplitudes of the extracted signals to generate a sine carrier of the first phase-adjusted-amplitude-modulated carrier signal 264 that will eventually interfere with a disturbance signal that is caused due to excitations at the corners 30. As one non-limiting example, the first mixer 252 may transform the signals inputted thereto by equation (14) discussed above.

Similarly, the second mixer 254 receives the cosine-function carrier signal 222 (from the sinusoidal carrier 218), the carrier phase angle adjustment value (at the selected frequency from the estimated transfer function 256) and the multiplexed signal (from the multiplexer 250). The second mixer 254 modifies the cosine-function carrier signal 222 based on the carrier phase angle adjustment value and the lead compensation information 260 from the estimated transfer function 256 to generate the second phase-adjusted-amplitude-modulated carrier signal 266. The second mixer 254 amplitude modulates second phase-adjusted-amplitude-modulated carrier signal 266 based on the amplitudes of the extracted signals to generate a cosine carrier of the second phase-adjusted-amplitude-modulated signal 266 that will interfere with a disturbance signal that is caused due to excitations at the corners 30. As one non-limiting example, the second mixer 254 may transform the signals inputted thereto by equation (15) discussed above.

The first and second phase-adjusted-amplitude-modulated carrier signals are compiled or summed to generate a total phase-adjusted-amplitude-modulated carrier signal 268. A gain, at box 270, is applied based on the gain adjustment value 262 to the total phase-adjusted-amplitude-modulated carrier signal 268 to generate the gain-and-phase-compensated actuator drive command 202, and the gain 270 applied is based on the gain adjustment value 262 that corresponds to the desired or targeted frequency created via the hydraulic mount assembly 12 to attenuate the vibration at the particular angular frequency of the wheel 28.

The gain 270 is then outputted to a bandpass filter 272 to produce a filtered-total-phase-adjusted-amplitude-modulated carrier signal. Generally, the bandpass filter 272 passes frequencies of a desired range, and attenuates frequencies outside of the desired range. In certain configurations, the frequencies of the corner 30 set by the bandpass filter 272 are about 10 Hertz (Hz) for highpass, and about 20 Hz for lowpass. The exact value of these frequencies will vary for the desired vehicle application. The filtered-total-phase-adjusted-amplitude-modulated carrier signal has the correct phase such that when applied to the actuator 64, vibrations will be reduced/attenuated to the passenger compartment 18. It is to be appreciated that in certain configurations, the bandpass filter 272 may be disposed between the total phase-adjusted-amplitude-modulated carrier signal 268 and the gain 270.

Turning to FIG. 7, the method includes using a tracking filter 274 to output the velocity $V_p$ of the plug 72 (box 224) based on the speed $V_{vs}$ of the vehicle 14 and a voltage applied via the actuator 64 (box 276) to move the plug 72. The velocity $V_p$ of the plug 72 is generally within a tunable, narrow band of frequencies. The tracking filter 274 may be further defined as a band pass filter that is voltage controlled and/or digitally implemented. Generally, the tracking filter 274 passes vibratory content at frequencies of a desired range, and attenuates vibratory content at frequencies outside of the desired range.

Next, continuing with FIG. 7, the method includes determining the phasor 230 based on the velocity $V_p$ of the plug 72 over the time interval. Specifically, the phasor 230 is derived from the information from the tracking filter 274. The phasor 230 represents the phasor of the velocity of the plug 72 after filtering through the bandpass filter 274. The phasor 230 may use information outputted from the tracking filter 274, or alternatively, apply an averaging of the phasor 230 over multiple time intervals, which may include a present interval and a selected quantity of previous intervals. When the average of the phasor 230 is used, spurious instantaneous deviations are attenuated while lengthening response time of the controller 120.

Again, continuing with FIG. 7, the phasor 230 and the phasor of the amount of current $I_p$ that drives the plug 72, at box 236, are inputted into various mathematical equations at box 238 to determine the amount of displacement $Y_{body}$ of the body 16, at box 240, of the vehicle 14. The phasor 230 and the phasor of the amount of current that drives the plug 72, at box 236, are used to determine the phasor of the amount of displacement $Y_{body}$ of the body 16, at box 240, of the vehicle 14. The body 16 being referred to with regard to this displacement is the participating mass, not the total mass, and thus, does not include the dynamic mass 21 nor the suspension at the corners 30 of the vehicle 14 as discussed above. The mathematical equations at box 238 may include equations (3)-(11) discussed above, and also see FIG. 8. The estimate of the instantaneous angular velocity 206 may also be directly outputted to the mathematical equations at box 238.

Next, returning to FIG. 7, the amount of displacement of the body 16 is used to generate processed signals 242, 244 for the real component 242 of the body displacement 240 and the imaginary component 244 of the body displacement 240 that is 90 degrees out-of-phase from the real component 242.

The processed signals 242, 244 are compiled to generate extracted signals 246, 248. In certain configurations, compiling the processed signals 242, 244 to generate the extracted signals 246, 248 may further include compiling the processed signals 242, 244 to generate the first extracted signal and the second extracted signal. The first extracted signal may be the compilation or summation of equation (12) discussed above, and the second extracted signal may be the compilation or summation of equation (13) discussed above.

Then, the first and second extracted signals may be sent to the multiplexer 250 to generate the multiplexed signal that is outputted to an error controller 278. Then the extracted signals are transformed within the error controller 278 to output an error controlled signal. The multiplexed signal provides the magnitudes of the accumulated real component and the accumulated imaginary components of the vertical displacement of the body 16, as detailed above, and additional features of the multiplexer 250 are discussed above and will not be repeated. The error controller 278 may be a constant+proportional+integral+derivative (KPID) controller. The KPID may include a "PID" controller that is supplemented with a piecewise "K" functionality that enables a stepped application of corrective signal strength depending on the amplitudes of the error controlled signal. For example, a constant level of compensation may be applied during levels of relatively low vibration suppression to adequately reduce perceived vibration below detectable human levels.

Continuing with FIG. 7, the method may also include using a real-time signal generator 280 that uses the error controlled signal from the error controller 278. The real-time signal generator 280 may also receive the instantaneous angular velocity 206, the output(s) from the tracking filter 274, the phase of the velocity of the plug 72 outputted from the phasor 230, and the phase of the inverse transfer function and the lead compensation information 260 at the instantaneous angular velocity 206 outputted from box 256. The real-time signal generator 280 may also include a phase-locked loop (PLL) that receives the output of the tracking filter 274 and generates a 90-degree out-of-phase signal. The instantaneous angular velocity 206, the phase of the velocity of the plug 72 from the phasor 230, and the phase of the inverse transfer function and the lead compensation information 260 at the instantaneous angular velocity 206 at box 256, with the output from the multiplexer 250 are then used to construct a sinusoidal time-varying compensation output analogous to the output created at box 268 of FIG. 6.

Continuing with FIG. 7, generating the gain-and-phase compensated actuator drive command 202 may further include determining the estimated transfer function 256 based on the dynamic relationship between the phasor of the amount of current $I_p$ that drives the plug 72 and the phasor of the amount of displacement $Y_{body}$ of the body 16 of the vehicle 14. Furthermore, generating the gain-and-phase-compensated actuator drive command 202 may further include storing the look-up table 258 that includes the plurality of entries. Each of the entries may include the frequency, the value of the amount of current that drives the plug 72, the phasor of the amount of displacement $Y_{body}$ of the body 16 of the vehicle 14 which is responsive to the amount of current that drives the plug 72, and the carrier phase angle adjustment value with lead compensation information 260, and the gain adjustment value 262. The look-up table 258 may include the inverse transfer function that is a discretized representation of the inverse of the estimated transfer function 256 with the lead compensation information 260. The carrier phase angle adjustment value is the compilation, and more specifically the summation, of the angle of the inverse transfer function and the lead compensation information 260 which uses the instantaneous angular velocity 206. The gain adjustment value 262 is the magnitude of the inverse transfer function at the desired or targeted frequency created via the hydraulic mount assembly 12 to attenuate the vibration at the particular angular frequency of the wheel 28.

Continuing with FIG. 7, then, the sinusoidal time-varying compensation output (from the real-time signal generator 280) and the gain adjustment value 262 (from the estimated transfer function 256) are compiled to generate a total phase-adjusted-amplitude-modulated carrier signal that is outputted to box 270. Next, the gain 270 is applied based on the gain adjustment value 262 to the total phase-adjusted-amplitude-modulated carrier signal to generate the gain-and-phase-compensated actuator drive command 202. The gain 270 is based on the gain adjustment value 262 that corresponds to the desired or targeted frequency created via the hydraulic mount assembly 12 to attenuate the vibration at the particular angular frequency of the wheel 28.

Referring back to FIG. 6, another method of attenuating vibration transfer to the body 16 of the vehicle 14 using the dynamic mass 21 of the vehicle 14 includes receiving angular position information 210 regarding change in angular position of at least one wheel 28 over the time interval, and the angular position information is used to determine the angular frequency of the wheel 28. The method also includes determining, based on the angular position information, the instantaneous angular velocity 206 that corresponds to the angular frequency of the wheel 28, and the angular position that corresponds to the wheel 28. The method further includes generating the gain-and-phase-compensated actuator drive command 202 to counteract the vibration that occurs at the angular frequency of the wheel 28, which is based on the instantaneous angular velocity 206 and the angular position of the wheel 28. The gain-and-phase-compensated actuator drive command 202 is communicated to the hydraulic mount assembly 12 that supports the dynamic mass 21. The magnetic apparatus 76 of the actuator 64 of the hydraulic mount assembly 12 is energized which moves the plug 72 to the displaced position to correspondingly lock the casing 70 to the first plate 44 in the secondary position. Locking the casing 70 in the secondary position locks the decoupler 56 to the first plate 44 such that the decoupler 56 abuts the first plate 44 which causes the hydraulic action to occur through the first and second chambers 46, 48 of the hydraulic mount assembly 12 via the inertia track 58 of the hydraulic mount assembly 12. The plug 72 is positioned in the central position after locking the casing 70 in the secondary position, and the central position is different from the displaced position. Energizing the magnetic apparatus 76 may further include energizing the magnetic apparatus 76 to change the amount of the current through the coils 90 that magnetically interacts with the magnets 88 to cause fluctuation of the plug 72 from the central position while the casing 70 remains in the secondary position in order to minimize the vibration transfer to the body 16 due to the vibration that occurs at the particular angular frequency of the wheel 28 in response to the gain-and-phase-compensated actuator drive command 202.

This method may additional include various features discussed above, and detailed in the figures.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of attenuating vibration transfer to a body of a vehicle using a dynamic mass of the vehicle, and the vehicle includes at least one wheel, the method comprising:
receiving vehicle information over a time interval;
determining, based on the vehicle information, an instantaneous angular velocity that corresponds to a particular angular frequency of the wheel;
generating a gain-and-phase-compensated actuator drive command to counteract a vibration that occurs at the particular angular frequency of the wheel, which is based on the instantaneous angular velocity;
communicating the gain-and-phase-compensated actuator drive command to a hydraulic mount assembly that supports the dynamic mass; and
actuating an actuator of the hydraulic mount assembly in response to the gain-and-phase-compensated actuator drive command in order to minimize the vibration transfer to the body due to the vibration that occurs at the particular angular frequency of the wheel.

2. The method as set forth in claim 1 wherein actuating the actuator of the hydraulic mount assembly further comprises energizing a magnetic apparatus of the actuator which moves a plug and locks a decoupler to a first plate to cause hydraulic action between a first chamber and a second chamber.

3. The method as set forth in claim 2 wherein energizing the magnetic apparatus further comprises energizing the magnetic apparatus which moves the plug to a displaced position to correspondingly lock a casing to the first plate in a secondary position, and locking the casing in the secondary position locks the decoupler to the first plate such that the decoupler abuts the first plate which causes the hydraulic action to occur through the first and second chambers via an inertia track.

4. The method as set forth in claim 3:
further comprising positioning the plug in a central position after locking the casing in the secondary position, wherein the central position is different from the displaced position; and
wherein energizing the magnetic apparatus further comprises energizing the magnetic apparatus to change an amount of current through coils that magnetically interact with magnets to cause fluctuation of the plug from the central position while the casing remains in the secondary position in order to minimize the vibration transfer to the body due to the vibration that occurs at the particular angular frequency of the wheel.

5. The method as set forth in claim 1 wherein actuating the actuator of the hydraulic mount assembly further comprises energizing a magnetic apparatus of the actuator which moves a plug and locks a decoupler against a first plate to cause hydraulic action between a first chamber and a second chamber via an inertia track.

6. The method as set forth in claim 5 wherein:
receiving the vehicle information further comprises receiving angular position information that includes changes in an angular position of the wheel over the time interval;
determining based on the vehicle information further comprises determining, based on the angular position information, the instantaneous angular velocity that corresponds to the particular angular frequency of the wheel based on the angular position of the wheel; and
generating the gain-and-phase-compensated actuator drive command further comprises generating the gain-and-phase-compensated actuator drive command to counteract the vibration that occurs at the particular angular frequency of the wheel, which is based on the instantaneous angular velocity and the angular position of the wheel.

7. The method as set forth in claim 6 wherein generating the gain-and-phase-compensated actuator drive command further comprises:
generating, based on the angular position of the wheel, a sinusoidal carrier at a frequency that corresponds to the instantaneous angular velocity, wherein the sinusoidal carrier comprises at least two sinusoids that have a phase difference; and
individually mixing the at least two sinusoids of the sinusoidal carrier with a velocity of the plug to generate mixed signals.

8. The method as set forth in claim 7 wherein:
the sinusoidal carrier further comprises a sine-function carrier signal and a cosine-function carrier signal that is 90 degrees out-of-phase with respect to the sine-function carrier signal; and
individually mixing the at least two sinusoids of the sinusoidal carrier with the velocity of the plug to generate the mixed signals further comprises generating a mixed sine signal from the velocity of the plug and the sine-function carrier signal and generating a mixed cosine signal from the velocity of the plug and the cosine-function carrier signal.

9. The method as set forth in claim 8 further comprising:
determining a phasor based on an average of the mixed sine signal over the time interval and based on an average of the mixed cosine signal over the time interval;
using the phasor and an amount of current that drives the plug to determine an amount of displacement of the body of the vehicle;
using the amount of displacement of the body to generate processed signals for a real component of the body displacement and an imaginary component of the body displacement that is 90 degrees out-of-phase from the real component; and
compiling the processed signals to generate extracted signals.

10. The method as set forth in claim 9 wherein compiling the processed signals to generate the extracted signals further comprises compiling the processed signals to generate a first extracted signal and a second extracted signal.

11. The method as set forth in claim 10 wherein generating the gain-and-phase compensated actuator drive command further comprises determining an estimated transfer function based on a dynamic relationship between the amount of current that drives the plug and the amount of displacement of the body of the vehicle.

12. The method as set forth in claim 11 wherein:
generating the gain-and-phase-compensated actuator drive command further comprises storing a look-up table comprising a plurality of entries; and
each of the entries include a carrier phase angle adjustment value corresponding to a value of the instantaneous angular velocity with lead compensation information, and a gain adjustment value.

13. The method as set forth in claim 12 wherein:
the look-up table includes an inverse transfer function that is a discretized representation of an inverse of the estimated transfer function with the lead compensation information;
the carrier phase angle adjustment value is a compilation of an angle of the inverse transfer function and the lead compensation information at the instantaneous angular velocity; and
the gain adjustment value is a magnitude of the inverse transfer function at a targeted frequency created via the hydraulic mount assembly to attenuate the vibration at the particular angular frequency of the wheel.

14. The method as set forth in claim 12 further comprising:
compiling first and second phase-adjusted-amplitude-modulated carrier signals to generate a total phase-adjusted-amplitude-modulated carrier signal; and
applying a gain based on the gain adjustment value to the total phase-adjusted-amplitude-modulated carrier signal to generate the gain-and-phase-compensated actuator drive command.

15. The method as set forth in claim 5:
wherein receiving the vehicle information further comprises receiving a speed of the vehicle;
wherein determining based on the vehicle information further comprises determining, based on the speed of the vehicle, the instantaneous angular velocity that corresponds to the particular angular frequency of the wheel;
further comprising using a tracking filter to output a velocity of the plug based on the speed of the vehicle and a voltage applied via the actuator to move the plug at the velocity;
further comprising determining a phasor based on the velocity of the plug over the time interval;
further comprising using the phasor and an amount of current that drives the plug to determine an amount of displacement of the body of the vehicle;
further comprising using the amount of displacement of the body to generate processed signals for a real component of the body displacement and an imaginary component of the body displacement that is 90 degrees out-of-phase from the real component;
further comprising compiling the processed signals to generate extracted signals; and
further comprising mixing the extracted signals with an error controller to output an error controlled signal.

16. The method as set forth in claim 15 wherein:
generating the gain-and-phase compensated actuator drive command further comprises determining an estimated transfer function based on a dynamic relationship between the amount of current that drives the plug and the amount of displacement of the body of the vehicle;
generating the gain-and-phase-compensated actuator drive command further comprises storing a look-up table comprising a plurality of entries;
each of the entries include a value of the amount of current that drives the plug, the amount of displacement of the body of the vehicle, a carrier phase angle adjustment value corresponding to the value of the instantaneous angular velocity with lead compensation information, and a gain adjustment value;
the look-up table includes an inverse transfer function is a discretized representation of an inverse of the estimated transfer function with the lead compensation information; and
the gain adjustment value is a magnitude of the inverse transfer function at a targeted frequency created via the hydraulic mount assembly to attenuate the vibration at the particular angular frequency of the wheel.

17. The method as set forth in claim 16 further comprising:
compiling a sinusoidal time-varying compensation output from a real-time signal generator and the gain adjustment value to generate a total phase-adjusted-amplitude-modulated carrier signal; and
applying a gain based on the gain adjustment value to the total phase-adjusted-amplitude-modulated carrier signal to generate the gain-and-phase-compensated actuator drive command.

18. The method as set forth in claim 1 wherein the gain-and-phase-compensated actuator drive command causes the actuator to apply a periodic magnetic force to dynamically change a position of a plug to dynamically reduce periodic content at the particular angular frequency thereby attenuating the vibration transfer to the body of the vehicle using the dynamic mass of the vehicle.

19. A method of attenuating vibration transfer to a body of a vehicle using a dynamic mass of the vehicle, and the vehicle includes at least one wheel, the method comprising:
receiving angular position information regarding change in angular position of the wheel over a time interval, wherein the angular position information is used to determine an angular frequency of the wheel;
determining, based on the angular position information, an instantaneous angular velocity that corresponds to a particular angular frequency of the wheel, and an angular position that corresponds to the wheel;
generating a gain-and-phase-compensated actuator drive command to counteract a vibration that occurs at the particular angular frequency of the wheel, which is based on the instantaneous angular velocity and the angular position of the wheel;
communicating the gain-and-phase-compensated actuator drive command to a hydraulic mount assembly that supports the dynamic mass;
energizing a magnetic apparatus of an actuator of the hydraulic mount assembly which moves a plug to a displaced position to correspondingly lock a casing to a first plate in a secondary position, and locking the casing in the secondary position locks a decoupler to the first plate such that the decoupler abuts the first plate which causes hydraulic action to occur through first and second chambers of the hydraulic mount assembly via an inertia track of the hydraulic mount assembly;
positioning the plug in a central position after locking the casing in the secondary position, wherein the central position is different from the displaced position; and wherein energizing the magnetic apparatus further comprises energizing the magnetic apparatus to change an amount of current to coils that magnetically interacts with magnets to cause fluctuation of the plug from the central position while the casing remains in the secondary position in order to minimize the vibration transfer to the body due to the vibration that occurs at the particular angular frequency of the wheel in response to the gain-and-phase-compensated actuator drive command.

* * * * *